US011739253B2

(12) United States Patent
Chirdon et al.

(10) Patent No.: US 11,739,253 B2
(45) Date of Patent: Aug. 29, 2023

(54) SUSTAINABLE AGENTS FOR ENHANCED OIL RECOVERY AND DRILLING ADDITIVES DERIVED FROM MICROBIAL BIOMASS

(71) Applicant: University of Louisiana at Lafayette, Lafayette, LA (US)

(72) Inventors: William Chirdon, Lafayette, LA (US); Peter Schexnayder, Lafayett, LA (US); Garrett Thibodeaux, Lafayette, LA (US); Nicholas Baudoin, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

(21) Appl. No.: 17/012,597

(22) Filed: Sep. 4, 2020

(65) Prior Publication Data
US 2021/0071066 A1  Mar. 11, 2021

Related U.S. Application Data

(60) Provisional application No. 62/896,628, filed on Sep. 6, 2019.

(51) Int. Cl.
*C09K 8/58* (2006.01)
*C09K 8/035* (2006.01)

(52) U.S. Cl.
CPC .............. *C09K 8/58* (2013.01); *C09K 8/035* (2013.01)

(58) Field of Classification Search
CPC ...... C09K 8/58; C09K 8/035; C09K 2208/28; C09K 2208/34
See application file for complete search history.

(56) References Cited

U.S. PATENT DOCUMENTS

2012/0247763 A1* 10/2012 Rakitsky ............... C09K 8/68
                                          175/57
2014/0102699 A1*  4/2014 Pober ................... E21B 21/002
                                          166/267

OTHER PUBLICATIONS

"Soy Protein Isolate As Fluid Loss Additive in Bentonite-Water Based Drilling Fluids," Li, et al. ACS Applied Materials and Interfaces, 2015, vol. 7, pp. 24799-24809 (Year: 2015).*

* cited by examiner

*Primary Examiner* — Aiqun Li
(74) *Attorney, Agent, or Firm* — Kean Miller LLP; Lauren J. Rucinski; Brian J. Servé

(57) ABSTRACT

Proteinaceous enhanced oil recovery operates on the principle that proteins can be denatured using chemicals to break them down into a viscous polymeric mixture that exhibits an EOR effect. In one or more embodiments, the proteins in question are sourced from an algae (*spirulina*) meal, which could be obtained as a waste product from wastewater treatment or bioprocessing operations, including biofuel production where the lipids are extracted for fuel but the large volumes of proteins are considered a waste material with little or negative value. In other embodiments, other biomasses are used, especially edible biomasses, thereby mitigating public resistance to drilling operations due to concerns of perceived toxicity of chemicals. This also mitigates legal liability from the use of chemicals that are known to be toxic. Additionally, the agents are denatured biomasses that have not undergone expensive purification or separation steps. This will make these agents highly cost competitive. And, because there is no separation or purification, there are no wastes or byproducts from the synthesis to be disposed of. This also reduces costs compared to competitors.

5 Claims, 40 Drawing Sheets

Table 1a

| Denaturant Type | Denaturant Volume added (mL) | Water added (mL) | Water Flooding Recovery (%OOIP) | Polymer Recovery (%OOIP) | Total Recovery (%OOIP) | Relative Oil Recovery by Polymer (%RORP) (%RORP) |
|---|---|---|---|---|---|---|
| NaOH | 2.5 | 750 | 35.56% | 22.22% | 57.78% | 34.48% |
| | | 1000 | 36.81% | 12.64% | 49.45% | 20.00% |
| | | 1250 | 39.58% | 14.58% | 54.17% | 24.14% |
| | 5 | 750 | 44.50% | 17.00% | 61.50% | 30.63% |
| | | 1000 | 37.27% | 25.00% | 62.27% | 39.86% |
| | | 1250 | 37.50% | 20.00% | 57.50% | 32.00% |
| | 10 | 750 | 26.47% | 40.34% | 66.81% | 54.86% |
| | | 1000 | 34.68% | 43.55% | 78.23% | 66.67% |
| | | 1250 | 37.21% | 34.88% | 72.09% | 55.56% |
| | 15 | 750 | 32.73% | 47.73% | 80.45% | 70.95% |
| | | 1000 | 40.54% | 48.65% | 89.19% | 78.36% |
| | | 1250 | 43.87% | 48.39% | 92.26% | 45.73% |
| | 17.5 | 750 | 27.44% | 55.35% | 82.79% | 76.28% |
| | | 1000 | 30.20% | 47.03% | 77.23% | 67.38% |
| | | 1250 | 30.97% | 44.25% | 75.22% | 64.10% |

FIGURE 38

Table 1b

| Denaturant Type | Denaturant Volume added (mL) | Water added (mL) | Water Flooding Recovery (%OOIP) | Polymer Recovery (%OOIP) | Total Recovery (%OOIP) | Relative Oil Recovery by Polymer (%RORP) (%RORP) |
|---|---|---|---|---|---|---|
| Citric Acid | 2.5 | 750 | 35.45% | 26.46% | 61.90% | 40.98% |
| | | 1000 | 38.01% | 26.32% | 64.33% | 42.45% |
| | | 1250 | 43.79% | 29.41% | 73.20% | 52.33% |
| | 5 | 750 | 39.13% | 18.63% | 57.76% | 30.61% |
| | | 1000 | 35.79% | 13.16% | 48.95% | 20.49% |
| | | 1250 | 36.26% | 16.48% | 52.75% | 25.86% |
| | 10 | 750 | 38.65% | 19.92% | 58.57% | 32.47% |
| | | 1000 | 39.08% | 28.87% | 67.96% | 47.40% |
| | | 1250 | 31.29% | 12.90% | 44.19% | 18.78% |
| | 15 | 750 | 31.68% | 27.23% | 58.91% | 39.86% |
| | | 1000 | 32.87% | 19.72% | 52.60% | 29.38% |
| | | 1250 | 36.04% | 34.01% | 70.05% | 53.17% |
| | 17.5 | 750 | 35.35% | 35.35% | 70.71% | 54.69% |
| | | 1000 | 29.65% | 30.81% | 60.47% | 43.80% |
| | | 1250 | 34.29% | 41.71% | 76.00% | 63.48% |

FIGURE 39

Table 1c

| Denaturant Type | Denaturant Volume added (mL) | Water added (mL) | Water Flooding Recovery (%OOIP) | Polymer Recovery (%OOIP) | Total Recovery (%OOIP) | Relative Oil Recovery by Polymer (%RORP) (%RORP) |
|---|---|---|---|---|---|---|
| Urea | 2.5 | 750 | 34.18% | 6.63% | 40.82% | 10.08% |
| | | 1000 | 39.06% | 14.58% | 53.65% | 23.93% |
| | | 1250 | 30.83% | 15.04% | 45.86% | 21.74% |
| | 5 | 750 | 26.10% | 16.54% | 42.65% | 22.39% |
| | | 1000 | 36.62% | 11.74% | 48.36% | 18.52% |
| | | 1250 | 33.74% | 12.20% | 45.93% | 18.40% |
| | 10 | 750 | 37.75% | 16.06% | 53.82% | 25.81% |
| | | 1000 | 31.54% | 28.22% | 59.75% | 41.21% |
| | | 1250 | 35.34% | 17.67% | 53.01% | 27.33% |
| | 15 | 750 | 33.58% | 32.84% | 66.42% | 49.44% |
| | | 1000 | 33.61% | 24.90% | 58.51% | 37.50% |
| | | 1250 | 32.66% | 21.37% | 54.03% | 31.74% |
| | 17.5 | 750 | 33.20% | 21.05% | 54.25% | 31.52% |
| | | 1000 | 32.96% | 12.73% | 45.69% | 18.99% |
| | | 1250 | 30.58% | 14.88% | 45.45% | 21.43% |

FIGURE 40

SUSTAINABLE AGENTS FOR ENHANCED OIL RECOVERY AND DRILLING ADDITIVES DERIVED FROM MICROBIAL BIOMASS

CROSS REFERENCE TO RELATED APPLICATIONS

This application claims priority to U.S. Provisional Application No. 62/896,628 entitled Sustainable Agents for Enhanced Oil Recovery and Drilling Additives Derived from Microbial Biomass filed on Sep. 6, 2019.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

SUMMARY OF INVENTION

This invention claims converting algal biomass into production fluids for use in enhanced oil recovery or as a drilling fluid. This proteinaceous biomass, which is the main waste product of algae-based biofuels and other bioproducts, are modified and commercialized to produce conventional petroleum fuels, thereby benefiting both industries for the global energy portfolio. Tertiary oil production is generally performed on a thin profit margin to the point that for many wells it is not economically feasible to produce beyond a water flood. However, enhanced oil recovery (EOR) using waste proteins is a more viable option, especially if they are available at zero-cost or negative-cost. The injection of proteins into the earth poses little environmental risk and is considered a "carbon offset" for the produced petroleum, since this application of algal biomass is inherently carbon sequestering. This invention claims the EOR effect of algal biomass modified by a variety of denaturants has been quantified along with the rheology and the pH. Correlations between these properties, the denaturant type and concentration, and the EOR effects are provided.

DESCRIPTION OF THE DRAWINGS

The drawings constitute a part of this specification and include exemplary embodiments of the SUSTAINABLE AGENTS FOR ENHANCED OIL RECOVERY AND DRILLING ADDITIVES DERIVED FROM MICROBIAL BIOMASS, which may be embodied in various forms. It is to be understood that in some instances, various aspects of the invention may be shown exaggerated or enlarged to facilitate an understanding of the invention. Therefore the drawings may not be to scale.

FIG. 38 shows Table 1a: Summary of EOR results for NaOH as denaturant. 70 g of *Spirulina* powder was added to each water volume. Denaturants with a concentration of 1 M were then added as specified.

FIG. 39 shows Table 1b: Summary of EOR results for citric acid as denaturant. 70 g of *Spirulina* powder was added to each water volume. Denaturants with a concentration of 1 M were then added as specified.

FIG. 40 shows Table 1c: Summary of FOR results for urea as denaturant. 70 g of *Spirulina* powder was added to each water volume. Denaturants with a concentration of 1 M were then added as specified.

BACKGROUND

Figure 1:
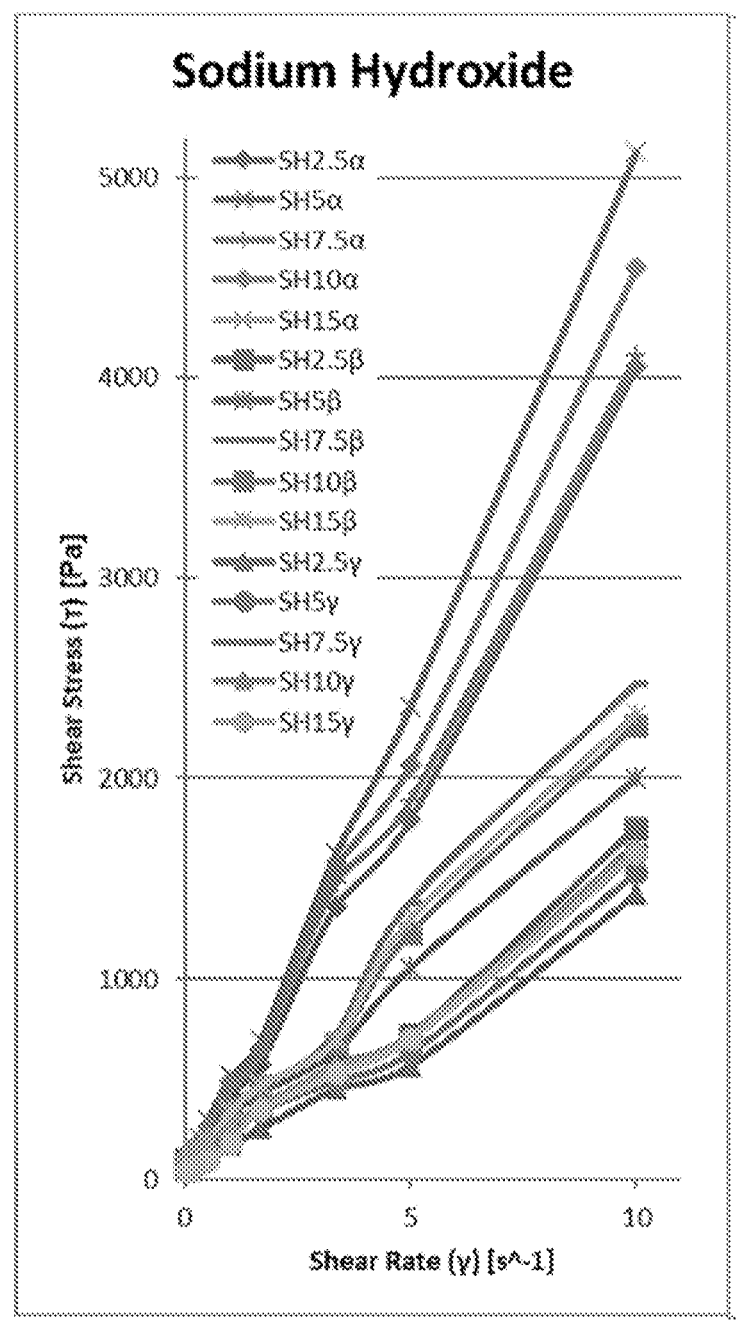
FIG. 1 is Rheological data (shear stress plotted vs. shear rate) for sodium hydroxide, which denotes polymer solutions by call codes comprised of three parts: two letters to denote the denaturant, a numerical value indicative of the volume of the denaturant solution in mL and a Greek letter indicating the amount of water added: α for 750 mL, β for 1000 mL, and γ for 1250 mL.

Oil is often considered the lifeblood of the industrialized world, making up 32% of the world's energy supply in 2017. In such a large industry, there is always a need to reduce production costs and increase production efficiency in order to meet the ever-growing demand. One way in which this can be accomplished is through the development of enhanced oil recovery (EOR) technologies. While primary recovery covers the cost of surveying, drilling, and producing, these wells are never drilled unless there is ample opportunity for profit. Likewise, secondary recovery (generally water flooding) is relatively low-cost, and water is continually injected to displace oil until it is no longer economical to continue production of that well. While this is sometimes at the 50% water-cut mark (that is, producing an instantaneous ratio of half oil, half water) there are cases where water flooding may be economical up to a 99% water-cut depending on the price of oil.

In contrast to these, tertiary oil production, or enhanced oil recovery, rarely has a sizeable profit margin. In fact, significant oil reserves are often left in reservoirs because it is not economically viable to produce them. Often, these processes are only feasible due to government incentives or prioritization by the leaders of national oil companies.

One popular example of an EOR polymer is partially hydrolyzed polyacrylamide (HPAM), which is "the most widely employed water-soluble polymer for use in both polymer waterflooding and in oilfield conformance polymer-gel treatments." Popular production polymers used in chemical flooding, such as HPAM, sell for median values of $1,500 per ton as of 2020, and require further chemical treatment to separate the polymer from the oil once produced, because it acts as an emulsifier.

This invention provides a new method of enhancing oil production which, although a type of chemical flooding (that is, the injection of chemicals suspended in water in order to produce oil), does not emulsify the recovered oil as much as conventional EOR agents. Conventional EOR agents use emulsification as a primary drive mechanism and may emulsify nearly all the oil. In contrast, the inventive EOR slurries produce a smaller volume of emulsion. The EOR drive mechanism is assumed to be related to the complex rheology and interfacial effects of the fluid.

Waste algal proteins for large-scale operations have an estimated value of $300 per ton or less as there is little demand for this biomass. Though it has been marketed as low-grade feed for farm animals, not even pigs will eat it unless it is compounded with other feed sources. This waste product is becoming increasingly prevalent from biofuel sources because algae possesses both a higher oil content and has a higher carbon capture ability than most biofuel feedstocks and produces what is considered a carbon-neutral fuel. As such, all the components of the EOR fluids tested here can be obtained for a fraction of the cost of contemporary enhanced oil recovery agents.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps like the ones described in this document, in conjunction with other present or future technologies.

The agents claimed represent a novel class of oilfield chemicals. The inventive chemicals are an improvement on the currently available alternatives, such as vegetable and algae-derived oils, which have been used in enhanced oil recovery ("EOR") and drilling fluids. The current inventive material is composed of proteinaceous biomass with a low oil content. In one embodiment, the proteinaceous biomass is unrefined; however, other embodiments are envisioned.

Microbial EOR has been proposed, but not widely implemented in the art. The claimed invention uses a biomass which is no longer live or active, whereas microbial EOR uses live microbes.

Tertiary EOR using polymer flooding is an established technology in the art using synthetic polymer, and some variations using polymers produced by microbes have been proposed. The current invention differs in that it utilizes a non-living, whole biomass that is proteinaceous.

This invention produces significant advantages over the prior art: increased effectiveness, along with the benefits of renewable, sustainable biomass. The inventive agents can be made from extremely inexpensive waste proteins that have little or no value, and in some instances have negative value. Thus, a company could be paid for removing waste proteins that would otherwise need to be landfilled, producing a collateral environmental benefit. Further, water streams that are polluted with organics/nutrients could be treated with microbes which could then be used to create these agents, thereby cleaning up polluted water streams, which is also a valuable service that can be monetized. In fact, microbes could also be harvested from polluted waterways where algal/microbial overgrowth has already occurred.

The biomasses to be used by this process will likely be the waste or byproduct of some sort of bioprocess. By creating a large-volume market for these waste biomasses, it can make the other bioprocesses viable or more profitable. For example, it could make biofuels from algae oil viable, or it could be used to recover costs related to wastewater treatment operations, including but not limited to municipal, agricultural, and industrial wastewater cleanup operations.

Since the EOR technology involves injecting carbonaceous biomass deep into the earth where it will be trapped in formations, it could be considered as an act of carbon sequestration. This has many benefits in cases if/when/where there would be a "carbon tax" on oilfield production as this technology would offer a carbon offset to reduce these costs. Even if there is no carbon tax in the jurisdiction of the production, the carbon sequestration could be sold as a carbon offset to another company, or different region of operation of the same company, which needs to purchase a carbon offset. This could also be used in public relations to market the company as a cutting-edge and environmentally responsible energy producer.

Proteinaceous enhanced oil recovery operates on the principle that proteins can be denatured using chemicals to break them down into a viscous polymeric mixture that exhibits an EOR effect. In one or more embodiments, the proteins in question are sourced from an algae (*spirulina*) meal, which could be obtained as a waste product from wastewater treatment or bioprocessing operations, including biofuel production where the lipids are extracted for fuel but the large volumes of proteins are considered a waste material with little or negative value. In other embodiments, other biomasses are used, especially edible biomasses, thereby mitigating public resistance to drilling operations due to concerns of perceived toxicity of chemicals. This also mitigates legal liability from the use of chemicals that are known to be toxic. Additionally, the agents are denatured biomasses that have not undergone expensive purification or separation steps. This will make these agents highly cost competitive. And, because there is no separation or purification, there are no wastes or byproducts from the synthesis to be disposed of. This also reduces costs compared to competitors.

In some embodiments, the biomass is made from algal proteins; however, as noted, the preferred embodiment is a biomass made from *Spirulina*.

*Spirulina plantesis* is approximately 45% crude protein by volume, above the average (42.8%) for algae used in biofuels, and both the grinding and the drying method used causes ruptures to cell walls, exposing more protein to the denaturants.

These denaturants cause folded proteins to break their secondary bonds, reverting them from complex, folded quaternary structures to randomly coiled primary structures which entangle with one another to create a viscous fluid, which is then diluted in water to reduce viscosity to levels manageable for oilfield pumps.

The denaturants used in the preferred embodiment are sodium hydroxide, citric acid, and urea. The Rheological data for each is presented in FIGS. 1, 2, and 3, respectively. However, other denaturants may be used. All three of these preferred denaturants are waste products or byproducts of various industries. These inexpensive chemicals are only needed in small concentrations relative to the volume of EOR fluid they generate.

This invention covers agents for enhanced oil recovery (EOR) and additives for drilling fluids derived from proteinaceous biomasses. In the definition of biomass, we claim biomasses that are proteinaceous with at least 10 dry wt % of protein before or after modification with denaturant. In other embodiments, biomasses that are high in protein or mostly protein (over 50 dry wt %) may be used. In other embodiments, we claim microbial biomasses composed of or derived from any type of microbe, including autotrophs, heterotrophs, and mixotrophs.

In other embodiments we claim biomasses of microalgae or derived from microalgae with protein contents of at least 10 dry wt %. In other embodiments we claim biomasses of microalgae or derived from microalgae with protein contents of over 50 dry wt %. Of particular interest are "waste" proteins which have little value or even negative value. A significant aspect of the novelty of the invention is that biomasses, including unrefined biomasses, can be used to create agents without the need for expensive separations or purifications, thereby making this technology highly cost-competitive in comparison to others.

In one or more embodiments, this invention claims direct application of biomass in EOR or drilling fluid applications, without processing or treatment. In another embodiment, this invention claims denaturation of biomass before direct use or mixing without components. In one or more embodiments, denaturation comprises modifying the pH using acids or bases; surfactants additions; and temperature and/or pressure changes which may be abrupt.

In one or more embodiments, the solids are removed or reduced before or after denaturation through filtration, sedimentation, centrifuge, or other process if needed if they are excessive or detrimental. The need for this step may depend on the specific biomass and application, but was not required to generate promising results in the experiments shown. The EOR agents may be used in tertiary recovery after water flooding as is typically done in polymer flooding. In other embodiments, the EOR agents be added to the water flooding recovery phase and may eliminate the need for a tertiary recovery. There could be applications for these agents as a viscosifiers, completion fluid additives, or substitutes for starch or xanthan gum.

In a preferred embodiment, alkaline denaturation of microalgal biomasses is performed. These biomasses can be used in ambient conditions or under "downhole" conditions where higher temperatures, pressures, and shear rates may be encountered. More specifically, since denaturation is a thermally activated process, lower denaturant concentrations, lower mixing temperatures, and lower reaction times will likely be optimal for actual oilfield implementation.

Example 1

Three different denaturants were tested for their ability to convert algal biomass into an effective EOR fluid. The denaturants used in these experiments are sodium hydroxide, citric acid, and urea. The sodium hydroxide and citric acid were included to test the effectiveness of denaturing under alkaline and acidic conditions, respectively. Urea was tested as a naturally-occurring chaotropic denaturant. None of these are expensive chemicals, and very little is used relative to the volume of EOR fluid generated.

Figure 2:
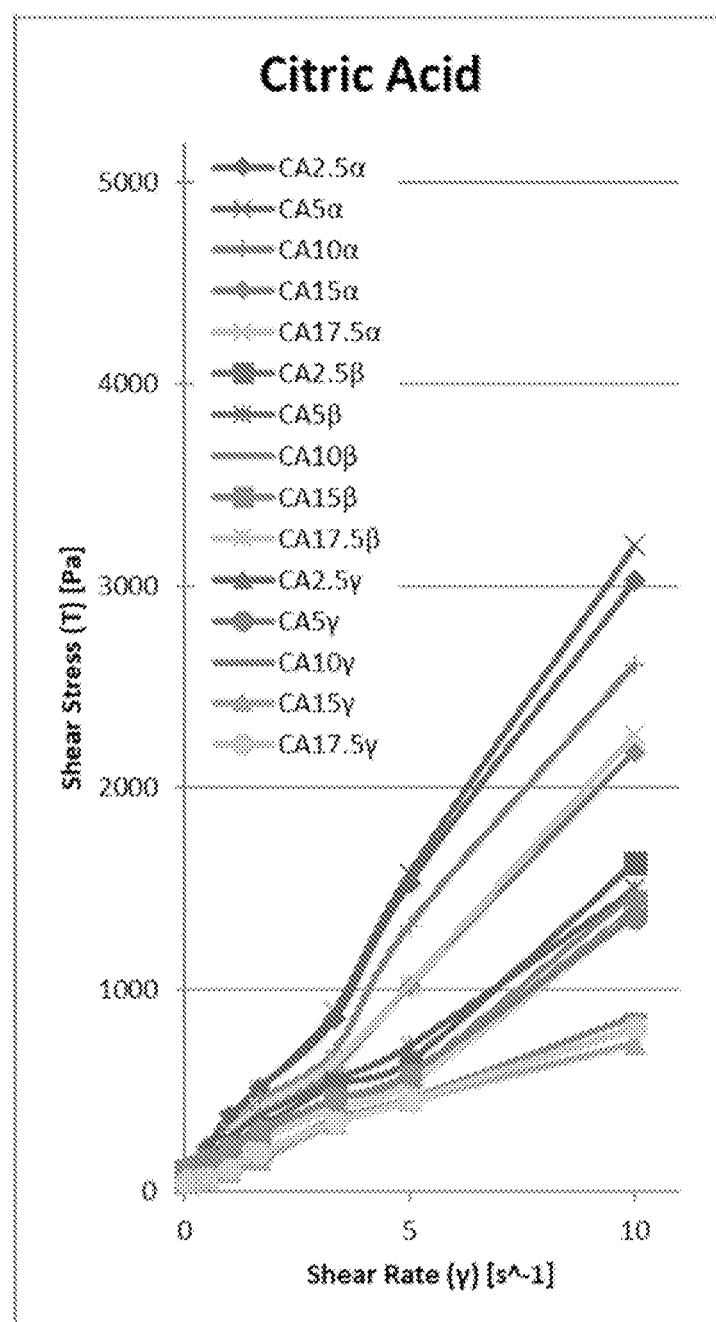
FIG. 2 is Rheological data (shear stress plotted vs. shear rate) for citric acid, which denotes polymer solutions by call codes comprised of three parts: two letters to denote the denaturant, a numerical value indicative of the volume of the denaturant solution in mL and a Greek letter indicating the amount of water added: α for 750 mL, β for 1000 mL, and γ for 1250 mL.

*Spirulina* algae meal (45-55% protein) was suspended in water and then chemically denatured using three different compounds in order to unravel proteins and create a slurry. Using different volumetric combinations of denaturant and water, 45 different EOR solutions were generated. Each sample of EOR fluid is made with 70 grams of *spirulina* powder in various amounts of water as shown in FIG. 2. The denaturants are composed of 1 molar solutions that were added in quantities of 2.5, 5, 10, 15, and 17.5 mL per sample. The EOR fluids are prepared by mixing on a magnetic stir plate. The dry algae powder is added slowly to the water while stirring until fully incorporated. Next, the denaturant is added to the solution, and the sample is allowed to mix for one hour. Afterward, the EOR fluid undergoes a series of tests.

The EOR fluids were tested for displacement efficiency in sand packs. In order to approximate the environment of a reservoir, and since most sand is acquired naturally, e.g. from an unconsolidated formation (that is, unstratified sediment which has not yet become rock) which would later become sandstone, all-purpose sand will typically fit a normal distribution or grain size curve to better resemble a typical sandstone formation. This sand was poured into clear acrylic tubing capped with 200-mesh sieves set in PVC plugs which step down to brass bushings used for connecting to reciprocating pumps. Once packed so that the sand was immobilized, the columns were capped and weighed dry.

Reciprocating pumps were operated at an initial rate of 5 mL/min and increased slowly to 25 mL/min. The initial low rate is used to ensure there is no leakage, and also to minimize shifting of the sand as new material is introduced into the matrix. The maximum rate was capped at 25 mL/min in order to minimize channeling effects. At higher rates, the injected fluid may force separation of the sand matrix in order to accommodate the new volume, creating "channels" or cracks in the packed sand. By pumping at a sufficiently slow rate, the injected fluid achieves a cleaner sweep of the matrix and is able to contact nearly all sand particles. It is for this reason that clear acrylic tubing is employed: so that proper packing and proper flow without channeling can be visually confirmed with every sand pack. A channeling-free sweep is visually confirmed with every sand pack at every step. If the sand within the tube exhibits a major channel or fissure, it is discarded and the test is performed again with a new sand pack.

Oil-bearing sandstone reservoirs are separated into three layers: gas-bearing, oil-bearing, and water-bearing. The top layer, known as the "gas cap," puts pressure on the fluids and keeps vapors saturated in both the oil and water. However, when oil is produced, the formation is perforated just above the oil-water contact, and gravity, the weight of the formation above, and the pressure of the gas all push to produce oil. However, as oil is produced, the gas cap expands to fill the void. Once the gas in the formation reduces past the bubble point, the gas is no longer under sufficient pressure to retain vapors. Beyond this point, the gaseous pressure is no longer able to drive the oil out, and the oil, now without vapor, is considered "dead oil." This is the point at which natural flow stops, and secondary production (water flooding) begins.

When oil is produced beyond the point of natural flow, water injection is employed to displace oil. However, the injection of liquids takes time to work its way through the pores of the formation, and the production pumps cannot realistically match rate of water absorbed into the formation. As a result, there is a discrepancy between the volume of water injected and the amount of fluid produced. This creates a phenomenon known as "water coning," in which brine from below the oil/water contact is sucked up into the production tubing. Therefore, when tertiary production commences, there is brine mechanically mixed in with the oil.

In order to model the environment of oil-bearing sandstone reservoirs, packs were then saturated with a 25,000 ppm brine, which has a known density of 1.028 g/cm$^3$ via the reciprocating pump. The samples are then weighed wet, and the difference in the weights is divided by the known density of the saline solution to determine the pore volume for the calculation of porosity.

Packs are then flooded with hydraulic oil, which has physical properties similar to "dead" crude oil (without vapors) but does not degrade to nearly the same extent as crude oil. This oil is pumped into one end of the sand pack and continues to be pumped until oil begins to exit the other end of the pack. A volumetric displacement is used to determine the oil saturation (generally in the 85% range) and brine saturation, also called irreducible water saturation. Because there are no vapors in the oil, both fluids are considered incompressible and β value (oil compressibility factor) of 1 may be assumed, yielding a 1:1 displacement. At this point, the sand pack is structurally similar to a sandstone reservoir above the oil/water contact.

Keeping with industry standards, the pack is injected with pure water and production is continued until produced samples, being measured once per minute, reach a 50% water cut. This is to say that the volume of produced fluid within the time interval is 50% water or more. This is on the lower end of critical water cut, which may be as low as 50% or as high as 99%, depending on the operating conditions and price of crude on the open market. However, for the purposes of this research, 50% is taken to be the assumed critical water cut. After this water flood, the sand pack is injected with the EOR solution.

In one or more embodiments, the EOR fluid is prepared by mixing on a magnetic stir plate. The water is spun up to a vortex, then the dry algae powder is added slowly until fully incorporated. Next, the denaturant is added to the solution and the sample is allowed to spin for one hour.

Finally, the EOR solution to be tested is injected into the sand pack in the amount of two pore volumes, beginning at 5 mL/min and slowly increased to 25 mL/min, after flooding the sand packs with a saline solution, dead oil (that is, devoid of suspended gases), and fresh water to a 50% water cut. The resulting slurry is allowed to separate out by gravity over a period of 2-3 days, generating three distinct layers: free oil at the top, oil/protein/water agglomerate in the middle, and a diluted polymer mixture in water at the bottom. The free oil volumes are measured for calculation purposes, though there is certainly more oil in the middle agglomerate.

Further research is needed to identify the structure of the agglomerate and a reasonable dissociative mechanism.

Oil recovery was quantified in several ways. The "water flooding recovery" represents the volume of oil recovered during water flooding relative to the volume of the original oil in place (% OOIP). The "polymer recovery" represents the volume of oil recovered during EOR fluid flooding relative to the volume of oil originally in place (% OOIP). The total recovery is simply the sum of the water recovery and the polymer recovery. The inventors prefer to also report the percent of oil recovery that occurs during polymer flooding relative to the oil in the sand pack before polymer flooding (% RORP) which more directly shows the effect of the polymer by accounting for the amount of oil available to be produced in this stage. Using the % RORP minimizes the variance in the results arising from the variance in the water flooding recovery and serves to isolate the effect of the EOR fluid. The results are summarized in Tables 1a, b, c.

Oil recovery was calculated by post-flood recovery values that represent the volume of oil recovered during the EOR fluid injection divided by the volume of oil present immediately before EOR fluid injection (but after water flooding). This eliminates the variance in the recovery due to the differing amounts of oil remaining after the water flood and better isolates the effect of the EOR fluid.

The % Oil Recovered is defined as below.

$$\% \text{ Oil Recovered} = \frac{\text{Oil recovered by } EOR \text{ fluid flood}}{\text{Oil present when } EOR \text{ fluid is injected}}$$

The calculated mixture measurements denote the pH of a simple dilution between the measured pH of the 1 molar denaturants and the water (tap). The theoretical mixtures denote the pH of perfect 1 M denaturant solutions and the water (tap and deionized). The formulas used to calculate these pH trends are shown below:

$$\text{pH of alkaline solution} = 14 - pOH_{soln}$$

$$pOH_{soln} = -\frac{\text{Log}\left(\sum_{i=1}^{\infty} [OH^-]_i * V_i\right)}{\sum_{i=1}^{\infty} V_i};$$

$$[OH^-]_i = OH^- \text{ concentration if component } i$$

$$V_i = \text{partial volume of component } i$$

$$\text{pH of acidic solution} = -\frac{\text{Log}\left(\sum_{j=1}^{\infty} [H^+]_j * V_j\right)}{\sum_{j=1}^{\infty} V_j};$$

$$[H^+]_j = H^+ \text{ concentration of component } j$$

$$V_j = \text{partial volume of component}$$

Figure 4:
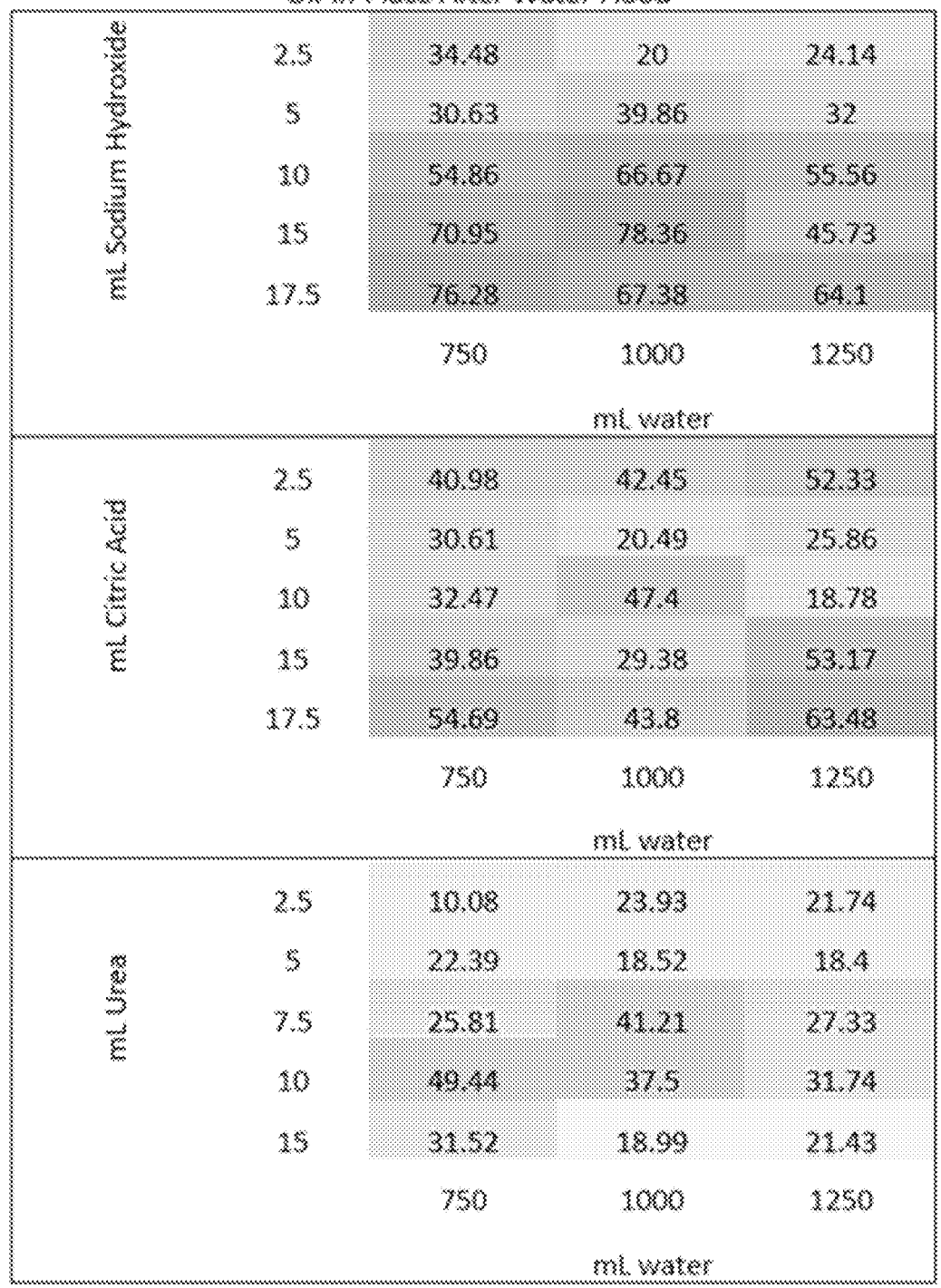
FIG. 4 is a Heat map of the percent of oil recovery that occurs during polymer flooding relative to the oil in the sand pack before polymer flooding (% RORP) for the denaturants.
Figure 5A:
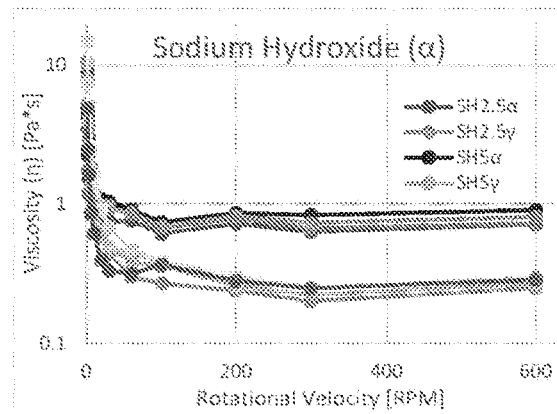
FIG. 5a shows viscosity vs. rotational velocity for sodium hydroxide (α).
Figure 5B:
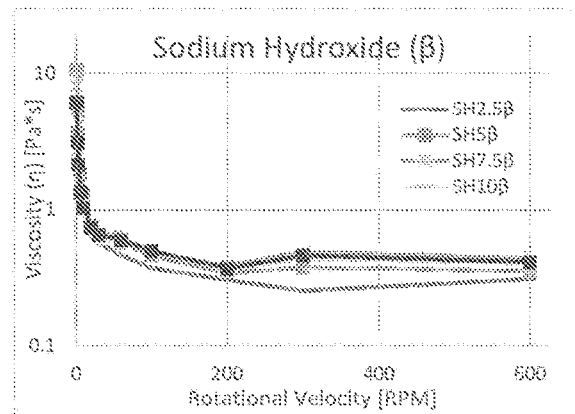
FIG. 5b shows viscosity vs. rotational velocity for sodium hydroxide (β).
Figure 5C:
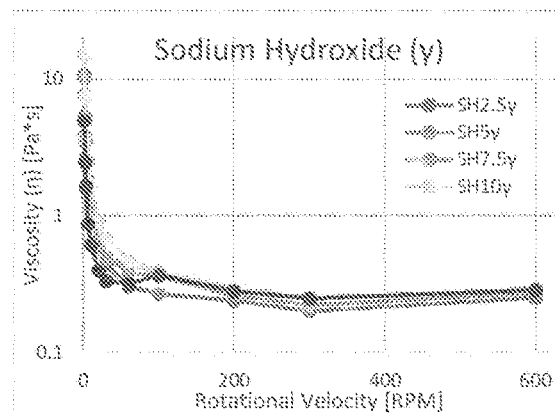
FIG. 5c shows viscosity vs. rotational velocity for sodium hydroxide (γ).
Figure 5D:
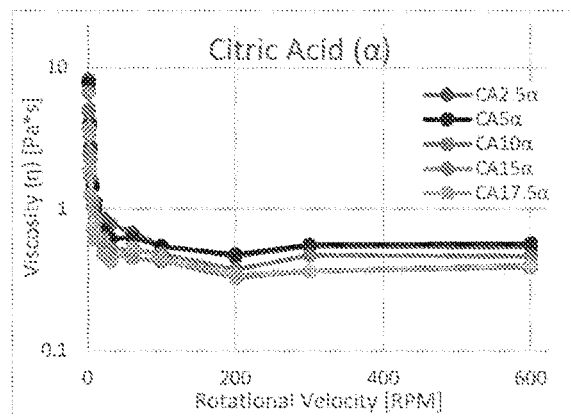
FIG. 5d shows viscosity vs. rotational velocity for citric acid (α).
Figure 5E:
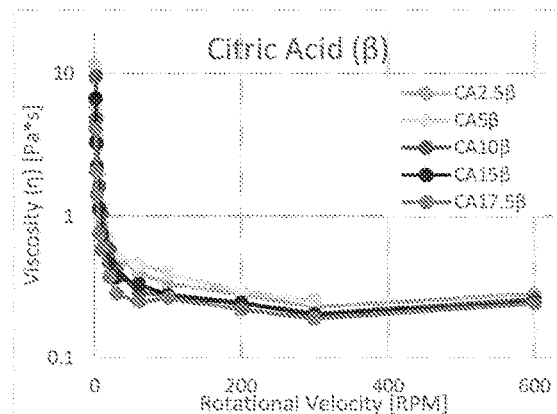
FIG. 5e shows viscosity vs. rotational velocity for citric acid e (β).
Figure 5F:
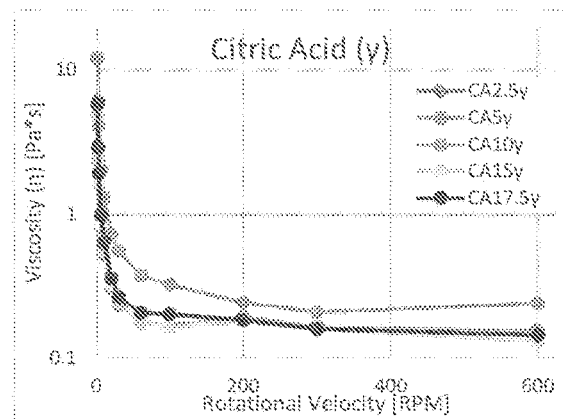
FIG. 5f shows viscosity vs. rotational velocity for citric acid (γ).
Figure 5G:
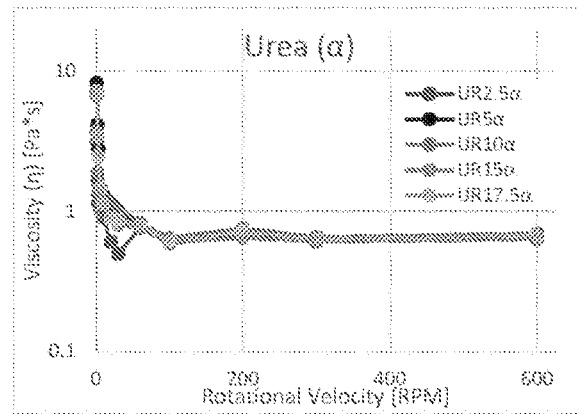
FIG. 5g shows viscosity vs. rotational velocity for urea (α).
Figure 5H:
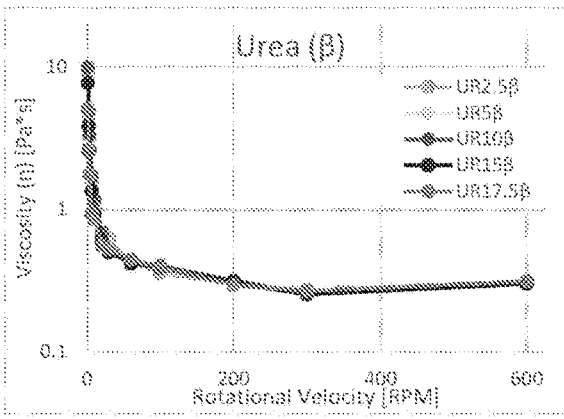
FIG. 5h shows viscosity vs. rotational velocity for urea (β).
Figure 5I:
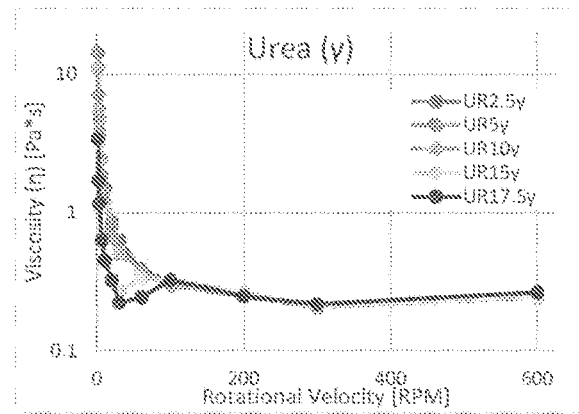
FIG. 5i shows viscosity vs. rotational velocity for urea (γ).

The results from the EOR experiments are presented in FIG. 4 and are shaded in order to provide a visual heat map. Values are shown as percentages, with darker colors indicating higher oil recovery values. While the chart for urea does not have a statistically significant correlation of increased oil recovery with respect to increased concentrations of denaturant (p=0.132), the charts for citric acid (p=0.021) and sodium hydroxide (p=0.048) do. The charts for sodium hydroxide and citric acid show higher production oriented toward more denaturant and less water. In the case of the urea samples, the peak oil recovery values occur with moderate amounts of denaturant added.

The composite pH chart (FIG. 31) shows interactions between the water, denaturants, and algae, respectively. If no chemical reactions occurred, the pH fluctuations would show nearly identical pH values and trends to that of theoretical dilutions of the materials. Deviations of these trends and values suggest that significant chemical reactions occur which can be attributed to the denaturation of the algae proteins, as well as other chemical reactions between denaturant and water impurities and the biomass.

Figure 31:
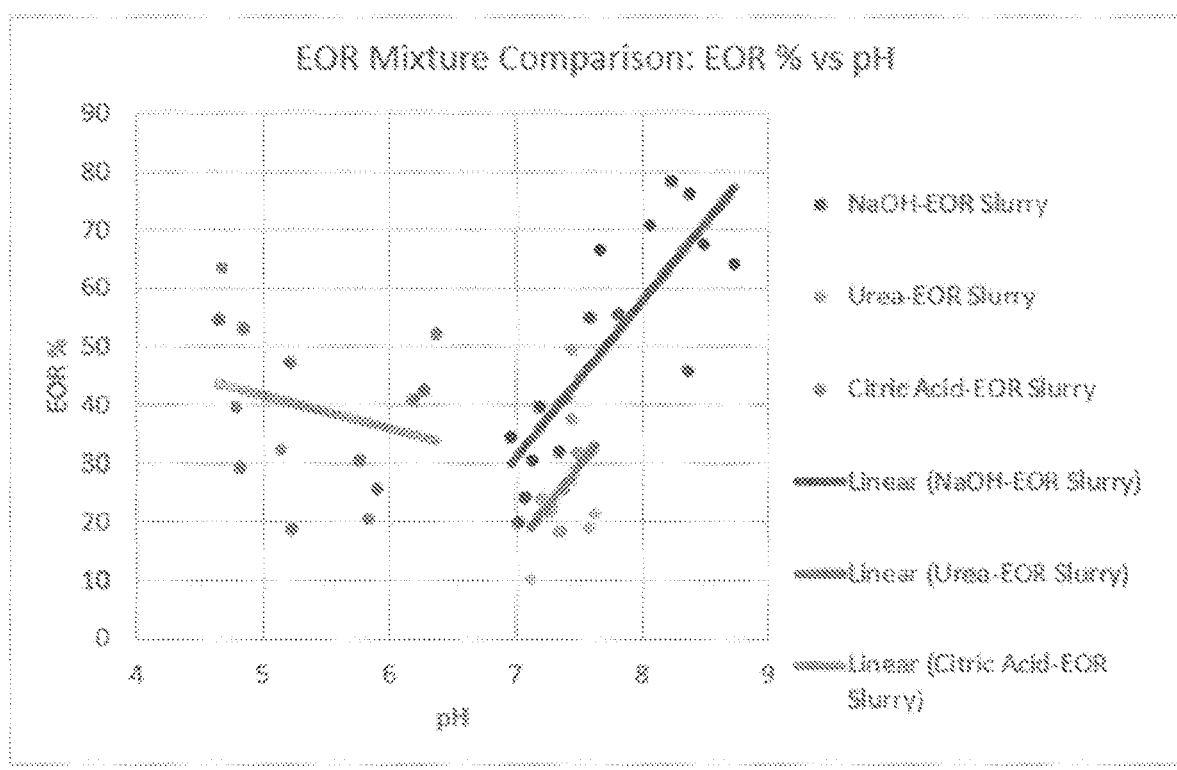
FIG. 31 is a graph showing percent oil produced vs. pH of EOR fluids from denatured algal biomass.

To investigate the correlation between EOR and pH, the data observed in FIG. 31 was fitted with a linear trendline. It is evident that higher recoveries are highly correlated with the movement of pH from a neutral value when the denaturant is an acid or a base (p=0.037 for citric acid and p=0.002 for sodium hydroxide). The EOR mixtures containing urea do not yield very high recovery values and are accompanied by low changes in pH and did not show a significant correlation of oil recovery with pH (p=0.23). The EOR mixtures containing citric acid do yield relatively higher recovery values, but the dependency on citric acid concentration is non-linear with higher EOR values being achieved with low and high concentrations of citric acid. Lastly, the EOR mixtures containing sodium hydroxide have proved very effective and reliable in regards to yielding increasing EOR % values as the pH also increases. The trendline slope for the EOR mixture containing sodium hydroxide is notably larger than the trendline slope for the citric acid EOR mixture, which may be due to the alteration in rock wettability by the EOR fluid, the shear thickening effects exhibited in these EOR fluids, the effectiveness of NaOH as a denaturant, or a combination of these mechanisms The pH comparison diagrams (FIGS. 32-34) show that there are significant chemical reactions between the denaturants and the algae. In mixtures of algae and water (absent of denaturant) the pH of the solutions α, β, and γ are: 6.67, 6.80, and 6.87, respectively. Thus, there is a slight reaction between the water and algal biomass, yielding a slightly acidic solution. If no significant chemical reactions were present, the pH values and trends of the EOR mixtures would remain almost identical to the theoretical dilution mixtures (absent of algae; see pH comparison charts), where no significant ion exchange takes place. As shown by the pH comparison charts, the values and trends of the EOR mixtures do not match their respective trends that are absent of algae, which depicts the presence of ion exchanges and ultimately denaturation of the algae within each EOR mixture.

Additionally, the diagrams denote the presence of chemical reactions occurring between the denaturants and tap water (in mixtures with an absence of algae), which can be seen by comparing the measured trend with the theoretical trends and calculated trends. Water and denaturant mixtures all show deviation between the measured pH values and the theoretical trends: Mixed only with tap water, sodium hydroxide mixtures showed a slight deviation in pH, urea mixtures showed a moderate deviation in pH, and citric acid mixtures showed large a deviation in pH. Additionally, the diagrams denote that the sodium hydroxide and citric acid show little to no signs of any significant interaction between the denaturants and tap water (in mixtures with an absence of algae), which can be seen by comparing the measured trends (denaturant and tap water) with the theoretical trends (denaturant and DI water), respectively.

Figure 32:
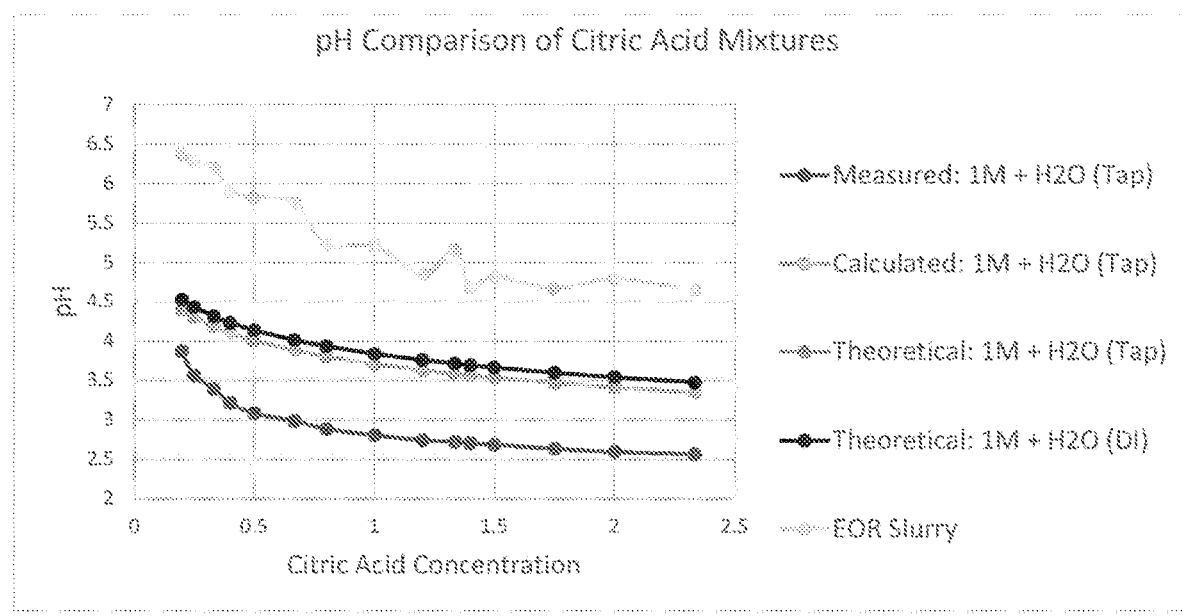
FIG. 32 is the pH comparison of citric acid mixtures.
Figure 33:
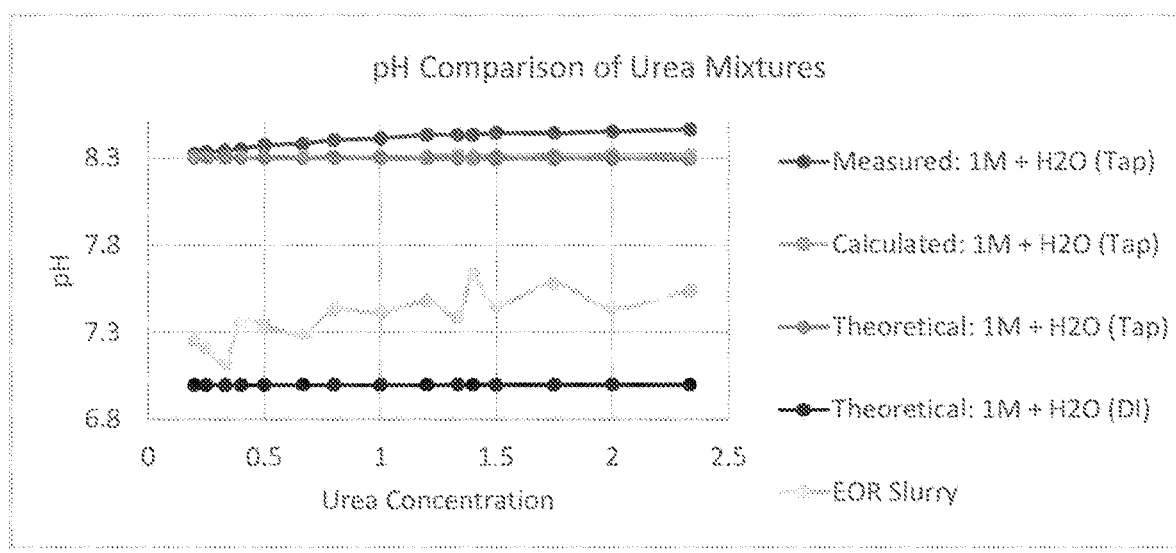
FIG. 33 is the pH comparison of urea mixtures.
Figure 34:
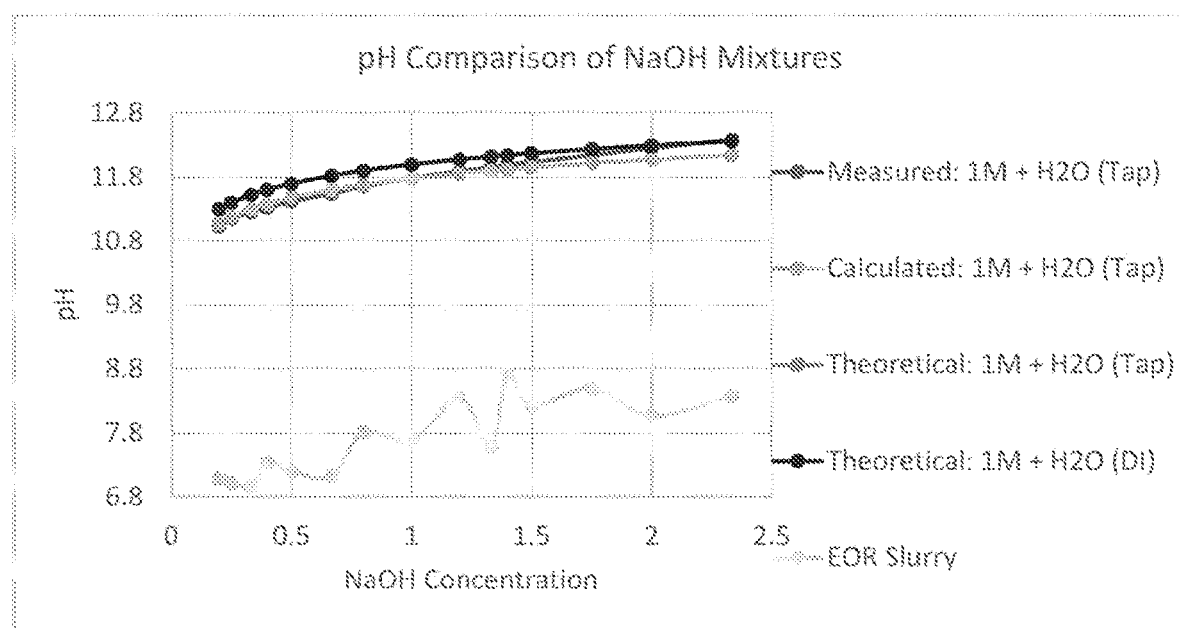
FIG. 34 is the pH comparison of sodium hydroxide mixtures.

FIGS. 32-34 section C denotes the presence of interaction between the tap water and the applied 1M urea solution, due to the relatively larger change in pH of the 1 M urea+tap-water mixture than a urea+DI-water mixture. Water and denaturant mixtures all show deviation between the measured pH values and the theoretical trends: Mixed only with tap water, sodium hydroxide and citric acid mixtures showed a slight deviation in pH, while urea mixtures showed a moderate deviation in pH for the urea+tap-water mixtures. The deviation in urea may occur from interaction with any residual buffers within the tap water, interactions with dissolved inorganic components (such as calcium or magnesium), and changes in the amount of hydrogen bonding between urea molecules and water molecules, or interactions from residual isocyanate or ammonia within the 1 M urea mixture.

Figure 3:
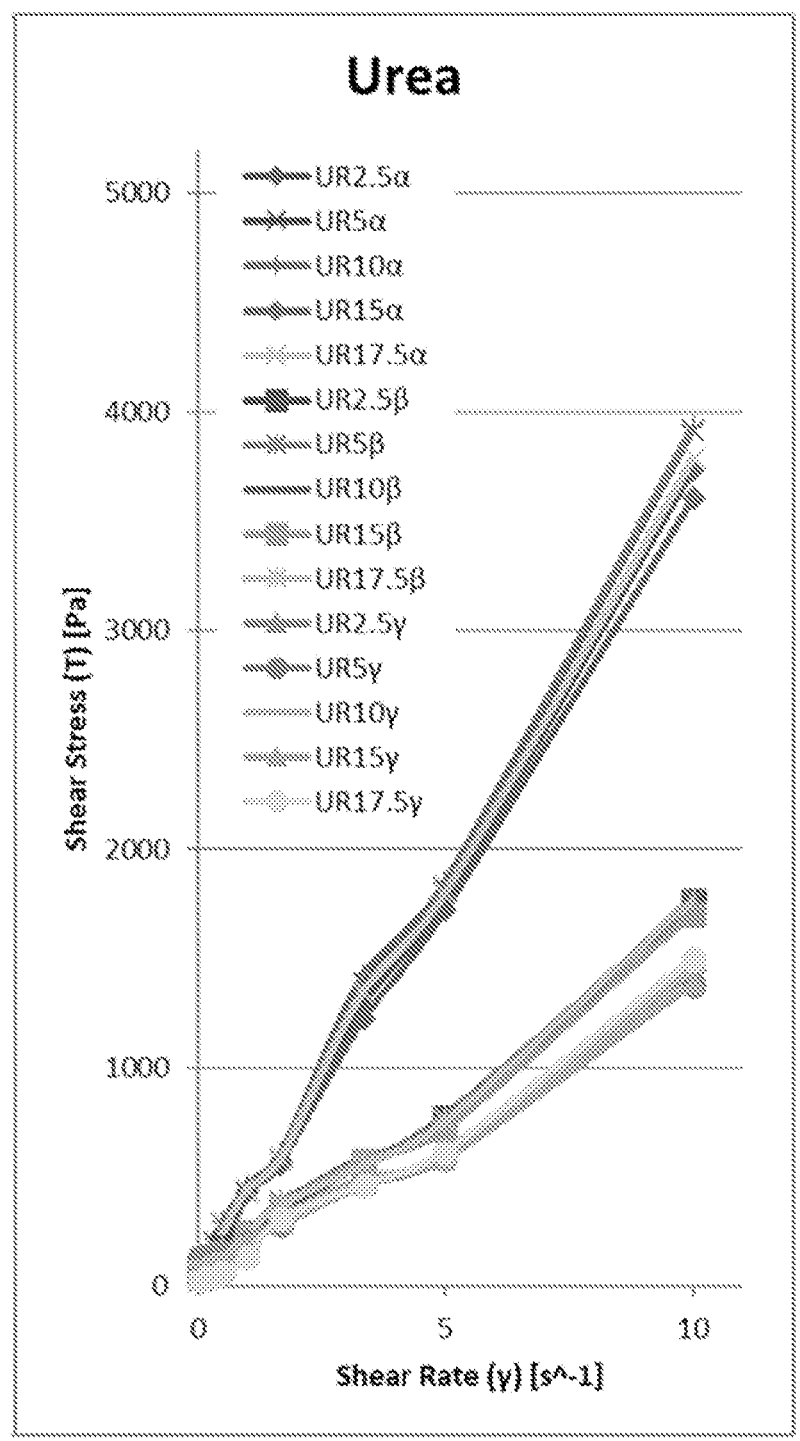
FIG. 3 is Rheological data (shear stress plotted vs. shear rate) for urea, which denotes polymer solutions by call codes comprised of three parts: two letters to denote the denaturant, a numerical value indicative of the volume of the denaturant solution in mL and a Greek letter indicating the amount of water added: α for 750 mL, β for 1000 mL, and γ for 1250 mL.

The rheological properties were also characterized as shown in FIGS. 1-3. Shear-thickening (dilatant) fluids are known to have positive EOR effects, so this mechanism may be largely or partially responsible for the effectiveness of this EOR fluid.

Each rheology chart shows how the amount of water present directly influences the relationship between shear rate and shear stress. All the polymer solutions tested seem to show dilatant trends in certain regions, though plotting the viscosity as a function of shear rate (FIG. 3) shows that the behavior is rather complex.

These rheology diagrams show that the EOR solutions showed dilatant tendencies over different ranges of shear rate. The increasing slopes of the shear stress with shear rate suggest that solutions in less water ($\alpha$) are more dilatant than those in more water ($\gamma$), as shown by the clustering of $\alpha$, $\beta$, and $\gamma$ solutions yielding three distinct orientations within each fluid group. This is corroborated by the viscosity increases.

Figure 37:
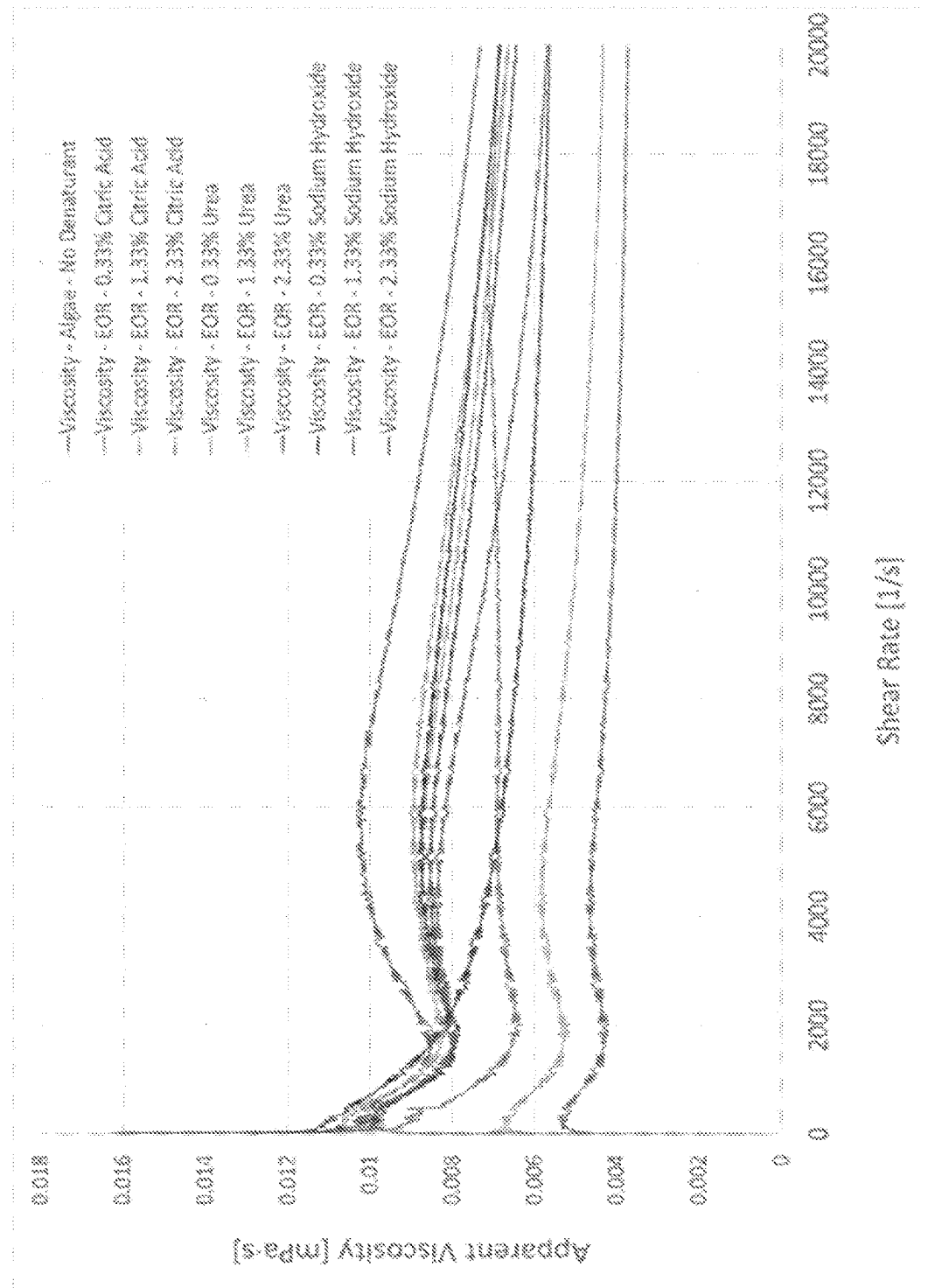
FIG. 37 shows the apparent viscosity as a function of shear rate.

FIG. 37 shows the apparent viscosity increases with NaOH concentration and decreases with citric acid concentration. Many EOR agents work through a viscosifying effect, so the high apparent viscosities of the NaOH solutions are likely contributing to their effectiveness. These rotational results were collected on an Anton-Paar MCR 302 rheometer using a parallel plate geometry.

The ranges of shear-thickening change can be observed based on formulations. The EOR formulation can be modified to increase or decrease the flow through a given por size under specified conditions based on the location of the shear-thickening region.

As the composite heat map (FIG. 4) shows, the sodium hydroxide output is much higher than that of either citric acid or urea. This is likely because it was more effective in denaturing the algae. The discrepancy between the sodium hydroxide and citric acid results may also be explained via the phenomenon of alkaline flooding. This well-documented effect, while not well understood, states that alkaline fluids cause the surfaces of capillaries in reservoirs, if oil-wet, to become water-wet. This phenomenon is a result of the surface condition of the formation changing due to the properties of the substrate: the hydroxide ions from alkaline material increases the negative charges on silica and negates the positive charge on any clays in the formation. This results in a large sum of the oil that is untouched by water flooding to be released into the larger pores, increasing production. However, many of these capillaries are networked and could not be reached if the polymer favored the larger pores.

The rheology diagrams (FIGS. 1-3) show that the polymer solutions tested are dilatant. The diagrams also show that solutions with higher concentrations of protein are more dilatant. This, when observed in light of the first heat map, suggests that dilatant fluid properties aid in the production of oil. The reason dilatant fluids aid in oil production is their shear thickening effect. When a fluid is shear thickening, its resistance to motion increases with shear rate. This results in a fluid which becomes more viscous when moving at higher velocity in large pores, thereby directing more flow into smaller pores. This allows a more even sweep of fluid in the formation with fewer pores being bypassed by the shear thickening EOR fluid.

Important to note is that the oil values shown in these tables are "free" oil values. That is to say that the oil measured is the oil which has separated from the mix by gravity after a period of days. There is, however, more oil in mixture.

Figure 35:
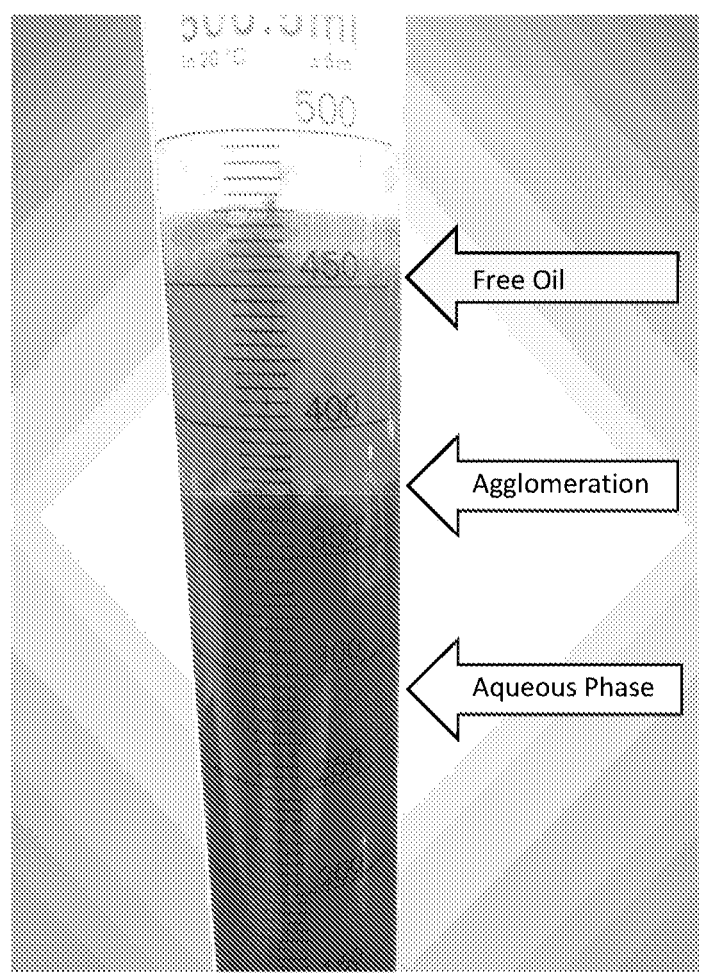
FIG. 35 shows the emulsion produced between free oil and the aqueous phase.

As displayed in FIG. 35, the free oil is separated from the dilute polymer mix below by an agglomeration of oil, water, and polymer. A close inspection shows that the interface is not flat; therefore, the mixture is not a pure liquid. The striations on the side suggest that it likely contains precipitated solids. The agglomeration is presumed to be oil suspended in precipitated protein, since it only develops when the EOR fluid is mixed with saltwater and oil, and not in the absence of salt.

It was also visually observed that oil is produced from the sand pack first, and once water begins to emerge, very little oil is produced afterward. This suggests that this heterogeneous mixture may be avoided if a new container is used to deposit the dilute polymer once the production line is expelling mainly water and polymer.

As expected, the water source significantly impacts the pH results. While deionized water is preferable for most laboratory experiments, tap water was used since deionized water would not likely be used in EOR formulations. The pH of the solutions was found to be significantly changed by the addition of algae, which indicates chemical reaction or interaction. The EOR effect seems to increase as the pH moves away from neutral. This result was expected since the proteinaceous biomass denatures as the pH moves away from neutral. A more detailed investigation into the specific chemical mechanisms of denaturation will need to be conducted in the future.

On the whole, comparing the aforementioned concentration groupings across the three fluid subsections of FIG. 4, EOR fluids denatured with sodium hydroxide can be shown to exhibit a higher shear stress at any given shear rate than those denatured with urea, which in turn can be said to have a higher shear stress than those denatured with citric acid at any given shear rate. As such, EOR fluids denatured with sodium hydroxide can be shown in FIG. 31 to have higher a higher viscosity than both those fluids denatured with urea and citric acid over the same intervals. Dilatant rheological behavior in EOR agents results in a fluid which moves more slowly in large pores, where it would normally flow at a higher rate, and moves relatively faster in smaller pores when compared to a Newtonian fluid. The added backpressure from the bulk of the fluid moving slowly in the large pores increases the flow into smaller pores, which increases the total surface area of the formation encountered by the EOR fluid.

Figure 36:
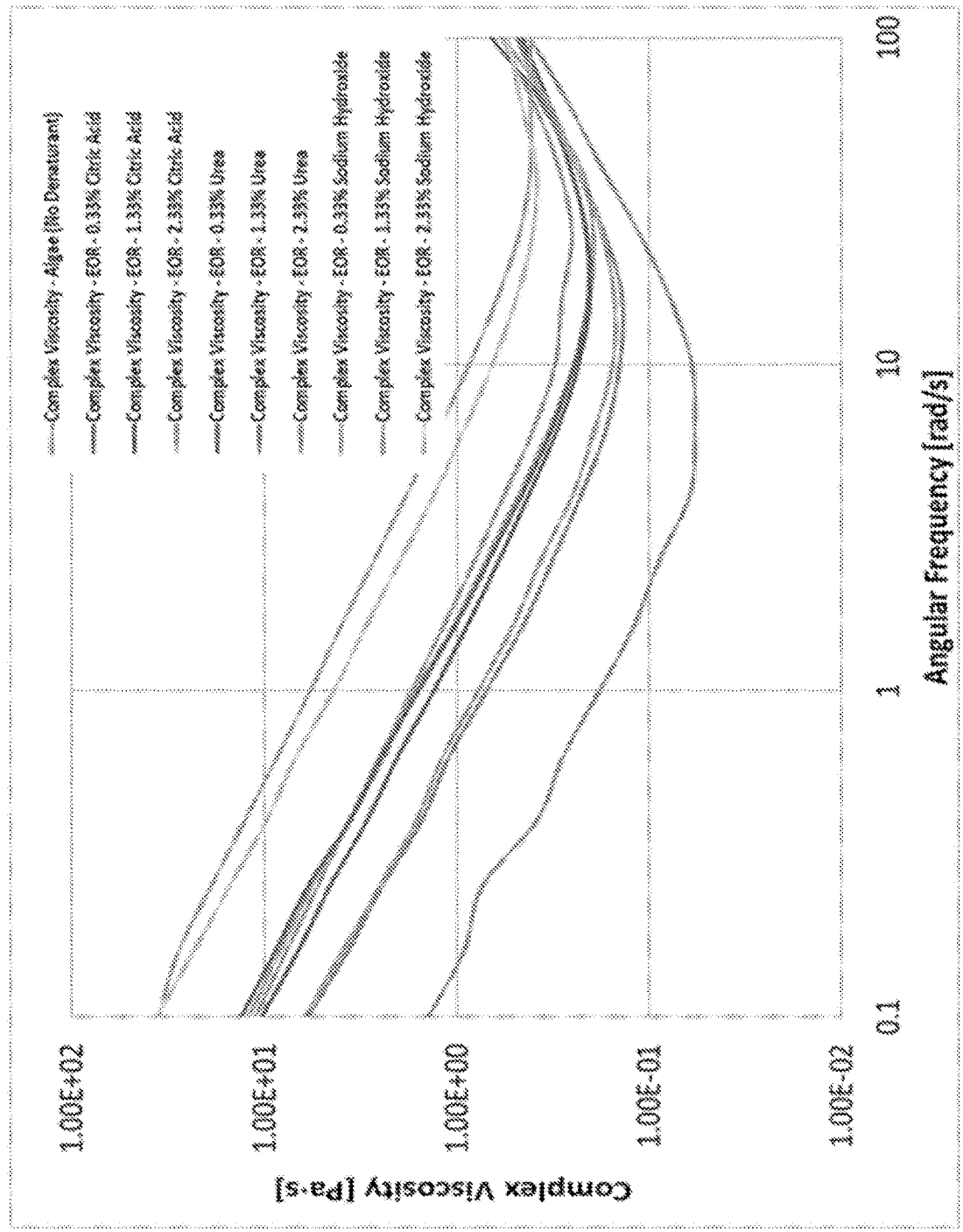
FIG. 36 shows the frequency sweep.

Oscillatory tests, such as this frequency sweep, also indicate the complex viscosity of the EOR fluids exhibits a range of shear thickening that depends on the denaturant type and concentration. These results were collected on an Anton-Paar MCR 302 rheometer using a parallel plate geometry with an amplitude of 0.5%. A graph showing the results is at FIG. 36.

It is important to note that the rheology profile of these fluids is not shear-thickening over a broad range. The reality is more complex and interesting in that there is a shear-thinning behavior likely due to structural changes in the dissolved proteins at low shear rates, and a shear thickening effect likely due to the colloidal solids at higher shear rates.

FIG. 5a-i displays the viscosity vs. shear rate measurements of all fluids tested, and the results do not fit any standard rheological model. As in FIG. 4, the results tend to split into three groupings which correspond with the concentration of algae with respect to water. There are regions of shear thickening displayed in the data, and these regions are reproduced in fluids with the same amount of added water. This shear-thickening region also moves reproducibly to different shear rates when different amounts of water are added, indicating that the region of shear thickening can likely be controlled and tailored to thicken at the desired shear rate for a particular application.

There are three plausible mechanisms that are likely to be the main drivers of the EOR effect of these fluids. First, all the fluids tested herein present a shear-thickening region in their rheological profile, which likely contributes to the overall increase in oil production of the system. Second, those fluids denatured with sodium hydroxide also benefit from the alkaline flooding effect which inverts the wettability of oil-wet capillaries and increases the overall yield. Third, all of the tested fluids have the benefit of a surfactant effect, as urea is itself a surfactant and alkaline flooding produces surfactants in situ both from naturally occurring "petroleum acids" and the decomposition of silica in the presence of hydroxides (Green & Willhite, 7.14 Alkaline Flooding, 2018). Citric acid produces surfactants by shifting the system to a lower pH.

Therefore, in the most successful EOR fluid tests, we propose the mechanisms of shear thickening, alkaline flooding, and surfactant activity contribute to the EOR efficacy. There are many drive mechanisms known to chemical flooding. However, the literature does not codify the types of mechanisms consistently, so one paper may claim a number of detailed drive mechanisms which may be encompassed by a single, broader mechanism claimed by another paper. Therefore, it is difficult to compare the mechanisms active in this system with others presented in literature, but we believe a novel combination of drive mechanisms cause the EOR effect in this fluid. With these mechanisms working in tandem, more interfacial surface area is contacted within the sand pack, more oil is expelled due to the sodium hydroxide samples' alkaline flooding properties, and the shear thickening behavior allows for oil to be pushed out with a more even sweep.

With a maximum efficiency of 78% of oil recovered from one injection of EOR solution (78% of oil in place after water flood was recovered by the EOR fluid injection. 96% of the oil originally in place was recovered with the water flooding and the EOR fluid injection combined), it is clear that EOR fluids derived from algae-based biomasses have potential applications in the oilfield. The denaturing of waste proteins is an untapped reservoir of potential for generating production polymers with innate surfactant properties, negating the need for a surfactant sweep afterward, and has the potential for a very low cost when compared to other chemical flooding agents such as HPAM. Utilization of this waste material from biofuels and other bioprocessing operations in an EOR formulation could present a sustainably-sourced, environmentally-friendly, inexpensive, and yet effective solution for both conventional and emerging industries.

Of the three denaturants (sodium hydroxide, citric acid, and urea) tested, sodium hydroxide made the most effective EOR fluids. The oil recovery reported was based on free oil volumes, and visual observation suggests that there is more oil produced in an agglomerated phase. This proteinaceous enhanced oil recovery is likely to operate by three mechanisms including shear thickening, alkaline flooding, and the surfactant effects.

Future research will test high-temperature, high-pressure systems, which will more closely model active reservoirs. Salinity effects will also be investigated as reservoirs can experience high variability in this area. There is also a need to determine the most effective method for breaking the emulsion produced below the free-oil line to increase oil recovery and recover clean water.

Example 2

As shown in Table 2, the base drilling fluid components include a viscosifier, caustic soda (NaOH), defoamer, lignite, Desco, xanthan gum, and barite. All materials were measured by weight on laboratory balances and mixed in a stainless-steel mixing cup (FIG. 1a) using a five spindle, single speed Multimixer. Samples were aged in glass jars using a roller oven.

TABLE 2

| Component | Function | Concentration (lb/bbl) |
|---|---|---|
| Water | Base fluid | Varied |
| Selected gel | Viscosifier | See |
| Organic polymer | Defoamer | 0.99 |
| Caustic soda | pH modifier | See |
| Lignite | Thinner | 23.1 |
| Desco | Deflocculant | 2.00 |
| Xanthan gum | Viscosifier | 0.50 |
| Barite | Weighting agent | Varied |

One lab barrel was mixed for each of the individual composition runs. A lab barrel is 350 milliliters and concentrations in pounds per barrel are roughly equivalent to grams per lab barrel as shown in Equation 1.

$$\text{Lab barrel concentration conversion} \quad \text{Equation 1}$$

$$\frac{lbm}{bbl} = \left(\frac{lbm}{bbl}\right)\left(\frac{453.592 \text{ g}}{lbm}\right)\left(\frac{bbl}{158987.3 \text{ ml}}\right)$$

$$\cong \frac{g}{350 \text{ ml}}$$

All component concentrations were held constant except for the water, barite, gel, and caustic soda. Barite and water were only adjusted to ensure a final fluid density of ten pounds per gallon while the gel and caustic soda concentrations were varied according to Table 3.

TABLE 3

| Fluid ID | Gel NT (lb/bbl) | Algae (lb/bbl) | NaOH (lb/bbl) |
|---|---|---|---|
| L-1 | 20.0 | 0.0 | 0.25 |
| L-2 | 0.0 | 20.0 | 0.25 |
| L-3 | 0.0 | 30.0 | 0.25 |

TABLE 3-continued

| Fluid ID | Gel NT (lb/bbl) | Algae (lb/bbl) | NaOH (lb/bbl) |
|---|---|---|---|
| L-4 | 0.0 | 40.0 | 0.25 |
| M-1 | 20.0 | 0.0 | 0.50 |
| M-2 | 0.0 | 20.0 | 0.50 |
| M-3 | 0.0 | 30.0 | 0.50 |
| M-4 | 0.0 | 40.0 | 0.50 |
| H-1 | 20.0 | 0.0 | 1.00 |
| H-2 | 0.0 | 20.0 | 1.00 |
| H-3 | 0.0 | 30.0 | 1.00 |
| H-4 | 0.0 | 40.0 | 1.00 |
| Fluid ID | Gel NT (lb/bbl) | Algae (lb/bbl) | NaOH (lb/bbl) |

After measuring the proper amount of water into the mixing cup, the specified gel is slowly added while mixing. Then, the defoamer is added before allowing the gel to hydrate by mixing for thirty minutes. When the caustic soda is added, the fluid will thicken significantly, and the surface will no longer stir. At this point, the lignite is added to thin the fluid, followed by Desco. The xanthan gum and barite are added after ten and five minutes, respectively. After a final fifteen minutes of stirring, the mud is transferred to a glass jar and hot-rolled (aged) overnight in a roller oven for sixteen hours.

All rheology measurements were taken in accordance with API RP 13B-1 and manufacturer operating instructions using an OFITE Model 900 Viscometer.

Following hot roll, the fluid is mixed for five minutes before being added to the viscometer sample cup. The bob is submerged to the indicated line on the sleeve. The sample is heated to 120° F. and dial reading measurements are taken at 600, 300, 200, 100, 6, and 3 rpm speeds. Plastic viscosity and yield point are calculated using Equation 2 Rotation is stopped for a 10 seconds and the maximum initial dial reading at 3 rpm is recorded as the gel strength. This was repeated for 10 and 30 minutes.

Equation 2: Calculation for Plastic Viscosity in Centipoise.

$$PV = R_{600} - R_{300}$$

Equation 3: Calculation for Yield Point in lb/100 ft$^2$.

$$YP = R_{300} - PV$$

All fluid loss measurements were taken in accordance with API RP 13B-1 and manufacturer operating instruction using an OFITE 4-Unit HTHP Filter Press. After adjusting the filter press thermocouples to 250° F., the pressurized collection cell is filled to 0.5 inches below the top. A filter paper is placed on top of the cell before installing the cap and tightening all screws and valve stems. The cell is inserted into the preheated jacket apparatus with the filter paper side down. After adjusting the top and bottom regulators to 100 psi, the top valve stem is opened to apply back-pressure to the fluid while heating. Once the cell has reached temperature, the top regulator was adjusted to 600 psi and the bottom valve opened to begin filtration at a differential pressure of 500 psi. After 30 minutes the bottom valve stem can be closed, and filtrate is collected from the condenser. To correct to the standard API filter size, the filtrate volume is doubled and recorded as the total fluid loss.

All lubricity measurements were taken in accordance with manufacturer operating instructions using an OFITE EP and Lubricity Tester. Prior to testing a set of drilling fluids, a calibration check was performed on the OFITE lubricity meter by submerging the ring and block of the meter in deionized water while rotating at 60 rpm. Once the reading stabilizes, the torque on the meter was zeroed. Using the torque arm, 150 inch-pounds of force was applied for five minutes and the stabilized torque reading was recorded. The meter reading for deionized water was recorded and the correction factor (CF) was calculated using Equation 4.

Correction factor due to water reading. Equation 4

$$CF = \frac{34}{\text{Meter Reading for Water}}$$

After the calibration check, the sample container was filled with the first drilling fluid and the ring and block was submerged. The readings were allowed to stabilize and the torque was zeroed. 150 inch-pounds of torque was applied and the reading after 5 minutes was recorded. Equation 5 shows the coefficient of friction (CoF) calculation using the torque wrench reading of 150 inch-pounds and torque shaft lever arm length of 1.5 inches. This can be corrected using Equation 6 and the correction factor from Equation 4. For an easier comparison of different studies and lubricants, a better measure is the percentage reduction of torque shown in Equation 7.

Coefficient of friction calculation for OFITE lubricity meter. Equation 5

$$CoF = \frac{\text{Torque Reading}}{\left(\frac{150 \text{ in-lb}}{1.5 \text{ in}}\right)} = \frac{\tau}{100 \text{ lb}}$$

Correction of coefficient of friction with correction factor. Equation 6

$$CoF_{corr} = (CoF)(CF)$$

Calculation of reduction in torque in percent. Equation 7

$$\%_{red} = \frac{CoF - CoF_{base}}{CoF_{base}}(100)$$

Figure 6:
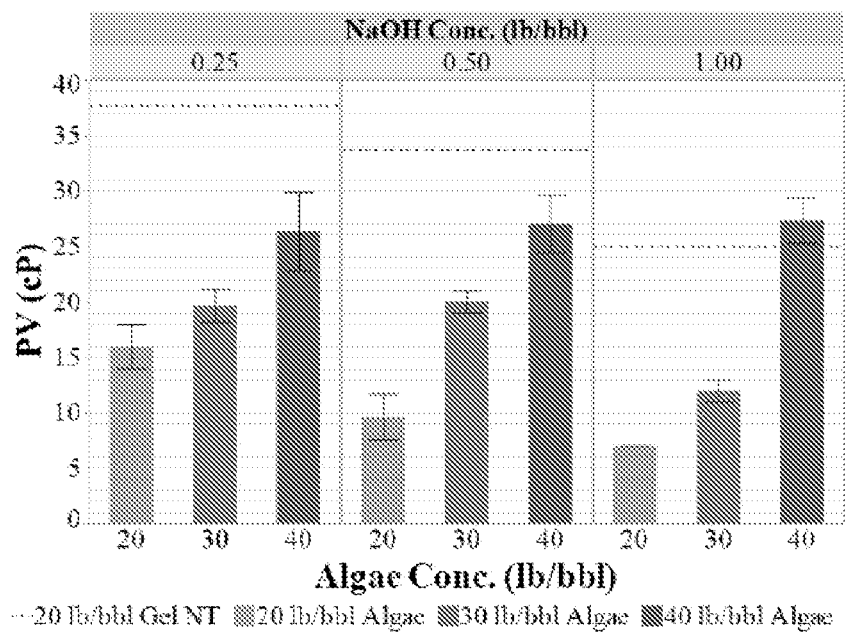
FIG. 6 is a graph of Plastic Viscosity (PV) results versus algae and caustic soda concentration.
Figure 7:
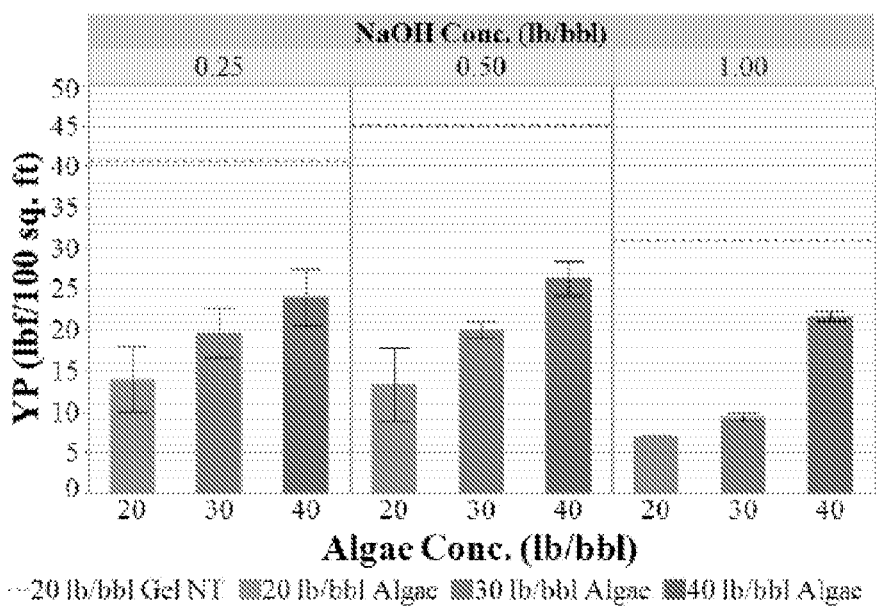
FIG. 7 is a graph of Yield Point (YP) results versus algae and caustic soda concentration.
Figure 8:
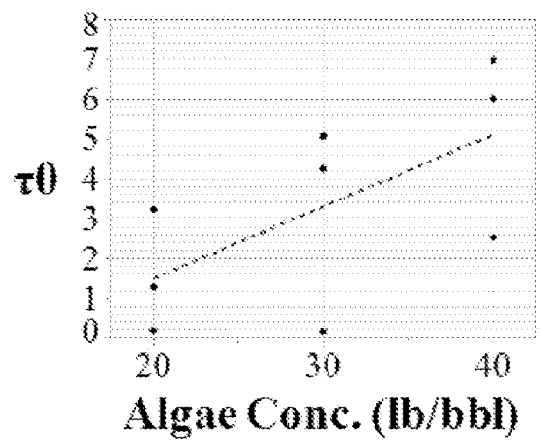
FIG. 8 is Fit of H-B parameter $\tau 0$ versus algae concentration.
Figure 11:
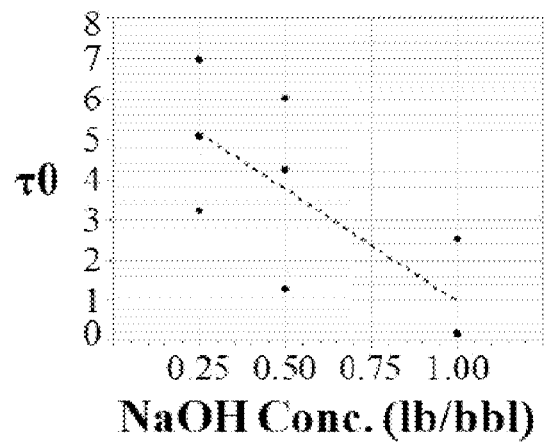
FIG. 11 is Fit of H-B parameter $\tau 0$ versus caustic concentration.
Figure 9:
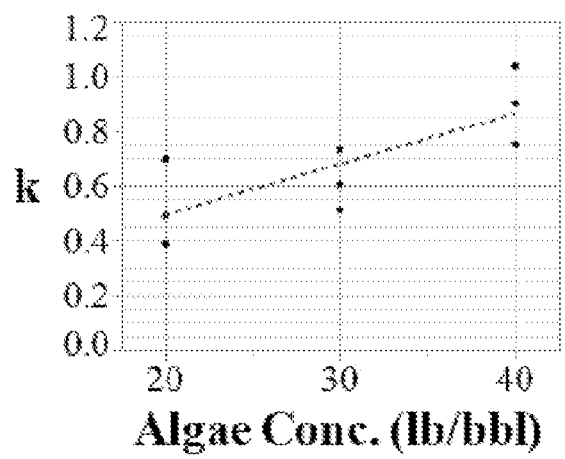
FIG. 9 is Fit of H-B parameter k versus algae concentration.
Figure 12:
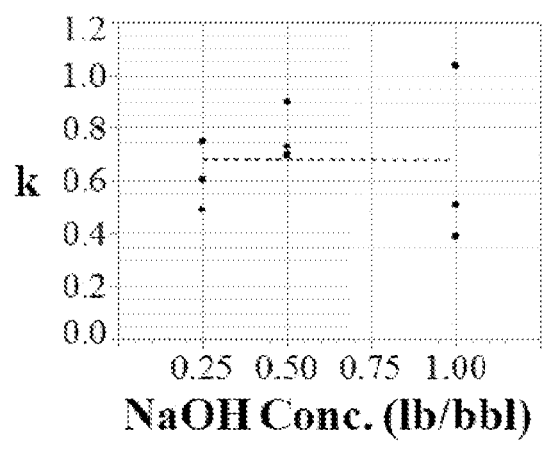
FIG. 12 is Fit of H-B parameter k versus caustic concentration.
Figure 10:
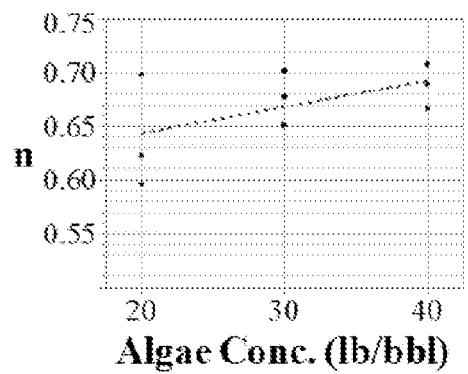
FIG. 10 is Fit of H-B parameter n versus algae concentration.
Figure 13:
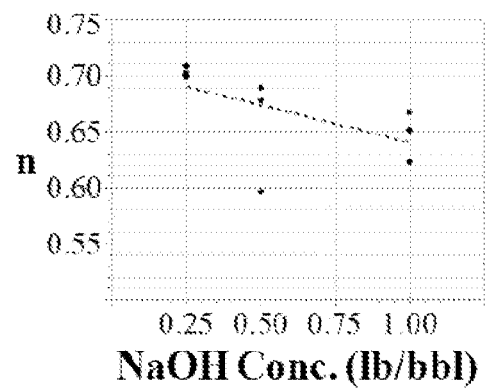
FIG. 13 is Fit of H-B parameter n versus caustic concentration.

Bingham plastic is a common two-parameter model for non-Newtonian fluids and is the traditional method of fluid characterization in the field since the parameters can be quickly calculated without the use of a computer or complex algorithm. The plastic viscosity (PV) and yield point (YP) for each sample calculated using Equation 2 and Equation 3 are shown in FIG. 6 and FIG. 7. As seen in FIG. 6, the increase of algae concentration led to an increase in plastic viscosity across all caustic soda (NaOH) concentrations; however, the only sample that was able to match or surpass the twenty (20) pound per barrel bentonite (Gel NT) control was the forty (40) pound per barrel algae concentration at one (1) pound per barrel of caustic soda. As with plastic viscosity, yield point increased with increasing algae concentration. FIGS. 7, 8 shows that none of the algae samples were able to achieve the yield point of their respective bentonite control. For plastic viscosity and yield point, the concentration of caustic soda did not have as significant of an effect on the values from low (0.25 pounds per barrel) to medium (0.50 pounds per barrel); however, there was a nearly fifty (50) percent drop in some cases when moving to the higher caustic concentration (1.00 pound per barrel).

Though Bingham-plastic is commonly used for characterizing drilling fluid rheological properties, research has shown that Herschel-Bulkley, a three-parameter model for viscosity shown in Equation 8 is a better fit for the behavior of water-based bentonite drilling fluids. The rheology readings for all fluids with were fit to a curve using the Herschel-Bulkley model. The fit parameters are shown in Table 3 for each fluid and the fit of the parameters versus algae and caustic concentration are shown in FIG. 8, FIG. 9, FIG. 10, FIG. 11, FIG. 12, and FIG. 13. Based on this analysis, all three parameters have a positive correlation with algae concentration. Although k does not show a significant correlation with caustic concentration, $\tau_0$ and n have a negative correlation.

Equation 8: Shear stress as a function of shear rate using the Herschel-Bulkley model.

$$\tau = \tau_0 + k\dot{\gamma}^n$$

TABLE 3.1

Herschel-Bulkley parameters fit for each fluid formulation

| Fluid ID | Gel NT (lb/bbl) | Algae (lb/bbl) | NaOH (lb/bbl) |
|---|---|---|---|
| L-1 | 20.0 | 0.0 | 0.25 |
| L-2 | 0.0 | 20.0 | 0.25 |
| L-3 | 0.0 | 30.0 | 0.25 |
| L-4 | 0.0 | 40.0 | 0.25 |
| M-1 | 20.0 | 0.0 | 0.50 |
| M-2 | 0.0 | 20.0 | 0.50 |
| M-3 | 0.0 | 30.0 | 0.50 |
| M-4 | 0.0 | 40.0 | 0.50 |
| H-1 | 20.0 | 0.0 | 1.00 |
| H-2 | 0.0 | 20.0 | 1.00 |
| H-3 | 0.0 | 30.0 | 1.00 |
| H-4 | 0.0 | 40.0 | 1.00 |
| Fluid ID | Gel NT (lb/bbl) | Algae (lb/bbl) | NaOH (lb/bbl) |

Table 3.2 shows the Mean Surface Tension Values of EOR Solutions and Baseline Fluids with 95% Confidence Intervals. The data was collected using the platinum DuNouy ring method with a KSV 702 Force Tensiometer. All of the EOR solutions significantly reduce the surface tension of the water, which may allow for greater penetration into porous media for improved oil recovery.

TABLE 3.2

| Fluid | Mean Surface Tension $\left(\frac{mN}{m}\right)$ | 2*Standard Deviation (95% confidence) |
|---|---|---|
| EOR Solution + No Denaturant | 46.60 | ±0.40 |
| EOR Solution + 0.33% 1M Citric Acid | 46.68 | ±0.24 |
| EOR Solution + 1.33% 1M Citric Acid | 48.15 | ±0.38 |
| EOR Solution + 2.33% 1M Citric Acid | 49.38 | ±0.34 |
| EOR Solution + 0.33% 1M Urea | 47.17 | ±0.62 |
| EOR Solution + 1.33% 1M Urea | 48.04 | ±0.22 |
| EOR Solution + 2.33% 1M Urea | 48.43 | ±0.38 |
| EOR Solution + 0.33% 1M Sodium Hydroxide | 46.52 | ±0.14 |
| EOR Solution + 1.33% 1M Sodium Hydroxide | 47.33 | ±0.20 |
| EOR Solution + 2.33% 1M Sodium Hydroxide | 47.25 | ±0.34 |
| Tap Water | 75.81 | ±0.40 |
| Tap Water + 2.33% 1M Citric Acid | 68.86 | ±0.13 |
| Tap Water + 2.33% 1M Urea | 62.01 | ±0.08 |
| Tap Water + 2.33% 1M Sodium Hydroxide | 72.12 | ±0.63 |
| Brine (25,000 ppm NaCl) | 76.01 | ±0.74 |
| Hydraulic Oil | 34.6 | ±0.06 |

Table 3.3 shows Mean Contact Angle Values of FOR Solutions and Baseline Fluids with 95% Confidence Intervals. The contact angles were determined via the sessile drop method using a Kruss advance drop shape analyzer—DSA100. The contact angle between the FOR fluid and a quartz surface indicate how much the fluid spreads on the surface. Note the lowest FOR contact angle (2.33% NaOH) had the highest oil recovery. These values along with surface tension can be used to calculate work of adhesion.

TABLE 3.3

| Fluid | Mean Contact Angle (° → radians) | 2*Standard Deviation (95% confidence) |
|---|---|---|
| EOR Solution + No Denaturant | 52.01 → 0.9073 | ±2.68 → ±0.0468 |
| EOR Solution + 0.33% 1M Citric Acid | 49.06 → 0.8558 | ±1.44 → ±0.0502 |
| EOR Solution + 1.33% 1M Citric Acid | 42.39 → 0.7395 | ±2.84 → ±0.0495 |
| EOR Solution + 2.33% 1M Citric Acid | 40.51 → 0.7067 | ±3.58 → ±0.0625 |
| EOR Solution + 0.33% 1M Urea | 46.69 → 0.8145 | ±3.00 → ±0.0523 |
| EOR Solution + 1.33% 1M Urea | 43.89 → 0.7656 | ±4.00 → ±0.0700 |
| EOR Solution + 2.33% 1M Urea | 40.55 → 0.7074 | ±2.72 → ±0.0474 |

TABLE 3.3-continued

| Fluid | Mean Contact Angle (° → radians) | 2*Standard Deviation (95% confidence) |
|---|---|---|
| EOR Solution + 0.33% 1M Sodium Hydroxide | 47.75 → 0.8330 | ±3.76 → ±0.0656 |
| EOR Solution + 1.33% 1M Sodium Hydroxide | 44.73 → 0.7803 | ±2.78 → ±0.0485 |
| EOR Solution + 2.33% 1M Sodium Hydroxide | 40.35 → 0.7039 | ±2.98 → ±0.0520 |
| Tap Water | 41.34 → 0.7212 | ±3.42 → ±0.0597 |
| Tap Water + 2.33% 1M Citric Acid | 39.62 → 0.6911 | ±2.96 → ±0.0516 |
| Tan Water + 2.33% 1M Urea | 40.51 → 0.7067 | ±3.34 → ±0.0583 |
| Tap Water + 2.33% 1M Sodium Hydroxide | 32.78 → 0.5718 | ±2.02 → ±0.0352 |
| Brine (25,000 ppm NaCl) | 50.13 → 0.8745 | ±2.32 → ±0.0405 |
| Hydraulic Oil | 23.42 → 0.4085 | ±4.74 → ±0.0827 |

Table 3.4 shows Interfacial Tension Values of FOR Solution Components and Baseline Fluids Against Hydraulic Oil. The data was collected using the platinum DuNouy ring method with a KSV 702 Force Tensiometer. The values of the interfacial tension between FOR solutions and the recovery do not have a simple correlation. Citric acid may produce inferior (compared to NaOH) EOR agents due to the resultant interfacial tension. This high IFT may make it difficult for citric acid to penetrate oil-filled pores and to convey the oil.

TABLE 3.4

| Fluid | Interfacial Tension $\left(\frac{mN}{m}\right)$ |
|---|---|
| EOR Solution + No Denaturant (suspension) | 2.26 |
| EOR Solution + No Denaturant (particulates) | 1.80 |
| EOR Solution + 0.33% 1M Citric Acid (suspension) | 1.68 |
| EOR Solution + 1.33% 1M Citric Acid (suspension) | 1.71 |
| EOR Solution + 2.33% 1M Citric Acid (suspension) | 2.07 |
| EOR Solution + 0.33% 1M Citric Acid (particulates) | 12.81 |
| EOR Solution + 1.33% 1M Citric Acid (particulates) | 21.27 |
| EOR Solution + 2.33% 1M Citric Acid (particulates) | 60.27 |
| EOR Solution + 0.33% 1M Urea (suspension) | 1.69 |
| EOR Solution + 1.33% 1M Urea (suspension) | 1.70 |
| EOR Solution + 2.33% 1M Urea (suspension) | 1.70 |
| EOR Solution + 0.33% 1M Urea (particulates) | 5.74 |
| EOR Solution + 1.33% 1M Urea (particulates) | 7.88 |
| EOR Solution + 2.33% 1M Urea (particulates) | 9.50 |

TABLE 3.4-continued

| Fluid | Interfacial Tension $\left(\frac{mN}{m}\right)$ |
|---|---|
| EOR Solution + 0.33% 1M Sodium Hydroxide (suspension) | 1.68 |
| EOR Solution + 1.33% 1M Sodium Hydroxide (suspension) | 1.67 |
| EOR Solution + 2.33% 1M Sodium Hydroxide (suspension) | 1.66 |
| EOR Solution + 0.33% 1M Sodium Hydroxide (particulates) | 1.82 |
| EOR Solution + 1.33% 1M Sodium Hydroxide (particulates) | 1.71 |
| EOR Solution + 2.33% 1M Sodium Hydroxide (particulates) | 1.70 |
| Brine (25,000 ppm NaCl) | 4.03 |
| Tap Water | 5.95 |
| Tap Water + 2.33% 1M Citric Acid | 14.60 |
| Tap Water + 2.33% 1M Urea | 5.66 |
| Tap Water + 2.33% 1M Sodium Hydroxide | 2.37 |

Table 3.5 shows Volumetric Analysis of 50 mL Samples of EOR Solutions after Centrifuge. All of the EOR solutions were centrifuged to separated out the solids. The best performing EOR agent also had the lowest % solids. If there are significant amount of large particles, they can block pores and limit EOR. However, a dispersion of smaller particulates may yield a shear-thickening rheological effect to improve EOR.

TABLE 3.5

| Solution | Suspension Volume (mL) | Particulates Volume (mL) | Volume Settled (%) |
|---|---|---|---|
| EOR Solution + No Denaturant | 36 | 14 | 0.28 |
| EOR Solution + 0.33% 1M Citric Acid | 35 | 15 | 0.30 |
| EOR Solution + 1.33% 1M Citric Acid | 32 | 18 | 0.36 |
| EOR Solution + 2.33% 1M Citric Acid | 30 | 20 | 0.40 |
| EOR Solution + 0.33% 1M Urea | 36.5 | 13.5 | 0.27 |
| EOR Solution + 1.33% 1M Urea | 35 | 15 | 0.30 |
| EOR Solution + 2.33% 1M Urea | 33.5 | 16.5 | 0.33 |
| EOR Solution + 0.33% 1M Sodium Hydroxide | 35 | 15 | 0.30 |
| EOR Solution + 1.33% 1M Sodium Hydroxide | 36 | 14 | 0.28 |
| EOR Solution + 2.33% 1M Sodium Hydroxide | 44.5 | 55 | 0.11 |

Table 3.6 Mean Work of Adhesion Values of EOR Solutions and Baseline Fluids with 95% Confidence Intervals. The work of adhesion indicates the energy with which the EOR solution interacts with a quartz surface. A higher work of adhesion would indicate a higher energy available for the EOR fluid to displace oil from the sand's surface. While this does not correlate with the effectiveness of different denaturants, it does correlate with the increasing EOR effect with concentration for a given denaturant.

TABLE 3.6

| Fluid | Mean Work of Adhesion $\left(\frac{mN}{m}\right)$ | 2*Standard Deviation (95% confidence) |
| --- | --- | --- |
| EOR Solution + No Denaturant | 74.98 | ±1.83 |
| EOR Solution + 0.33% 1M Citric Acid | 77.28 | ±1.81 |
| EOR Solution + 1.33% 1M Citric Acid | 83.72 | ±1.74 |
| EOR Solution + 2.33% 1M Citric Acid | 86.93 | ±2.09 |
| EOR Solution + 0.33% 1M Urea | 79.54 | ±2.08 |
| EOR Solution + 1.33% 1M Urea | 82.67 | ±2.35 |
| EOR Solution + 2.33% 1M Urea | 85.24 | ±1.64 |
| EOR Solution + 0.33% 1M Sodium Hydroxide | 77.81 | ±2.27 |
| EOR Solution + 1.33% 1M Sodium Hydroxide | 80.97 | ±1.65 |
| EOR Solution + 2.33% 1M Sodium Hydroxide | 83.27 | ±1.70 |
| Tap Water | 132.75 | ±3.07 |
| Tap Water + 2.33% 1M Citric Acid | 121.92 | ±2.31 |
| Tap Water + 2.33% 1M Urea | 109.17 | ±2.36 |
| Tap Water + 2.33% 1M Sodium Hydroxide | 132.77 | ±2.70 |
| Brine (25,000 ppm NaCl) | 124.76 | ±2.65 |
| Hydraulic Oil | 66.35 | ±1.14 |

Figure 14:
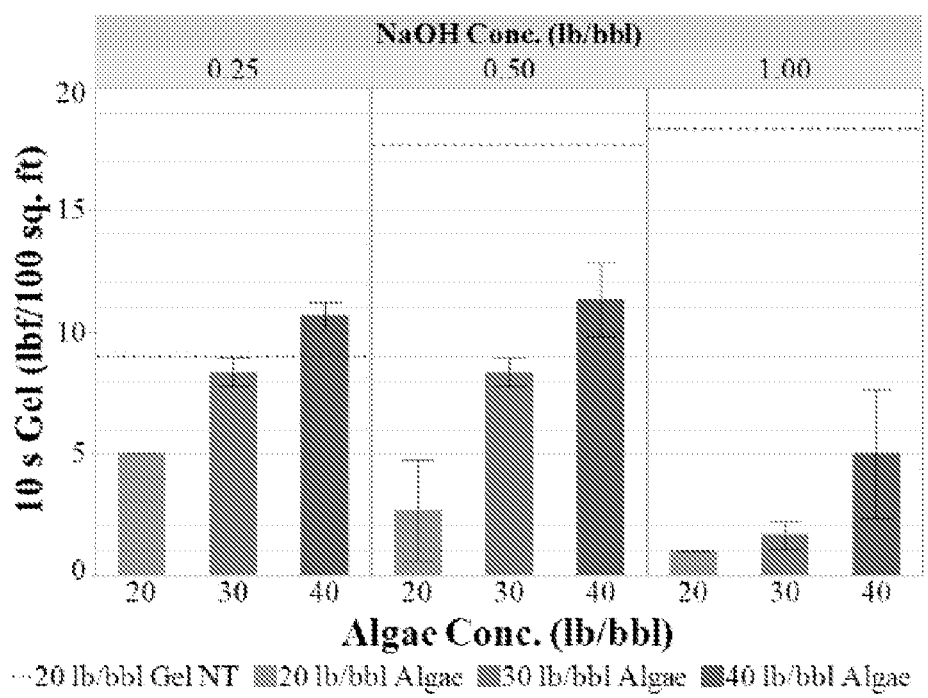
FIG. 14 is a graph of Ten second gel strength results versus algae and caustic soda concentration.
Figure 15:
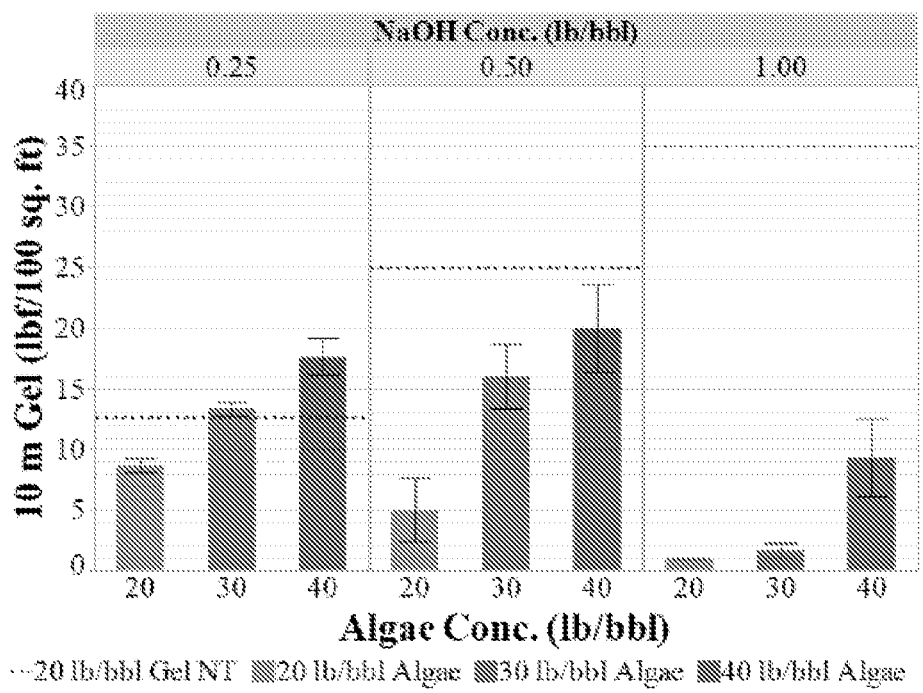
FIG. 15 is a graph of Ten-minute gel strength results versus algae and caustic soda concentration.
Figure 16:
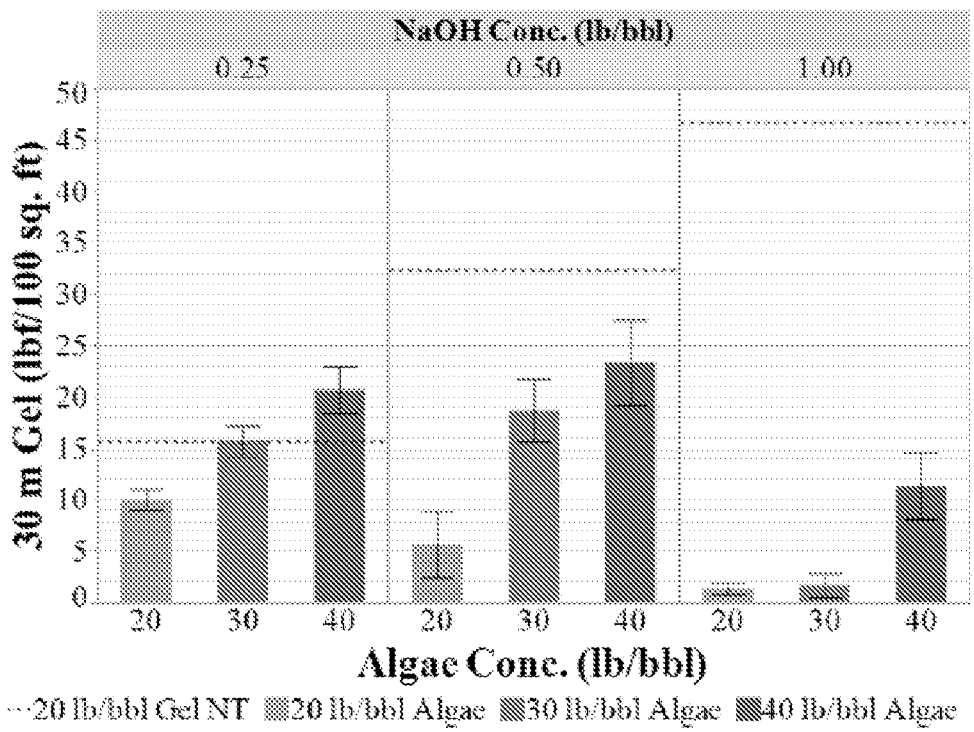
FIG. 16 is a graph of Thirty-minute gel strength results versus algae and caustic soda concentration.

The gel strength is a measure of the ability of a fluid to maintain viscosity after a period of static rest. FIG. 14, FIG. 15, and FIG. 16 show the results of ten-second, ten-minute, and thirty-minute gel strength readings, respectively. All values are an average of triplicate tests and the error bars are one (1) standard deviation from the mean. By comparing the dotted control lines on all three gel strength graphs, it is evident that the gel strength performance for the bentonite control is significantly impacted by caustic concentration. Due in part to this, the thirty (30) pound per barrel algae sample performed similarly to the control and the forty (40) pound per barrel sample outperformed the control. Otherwise, the control outperformed the algae.

Figure 17:
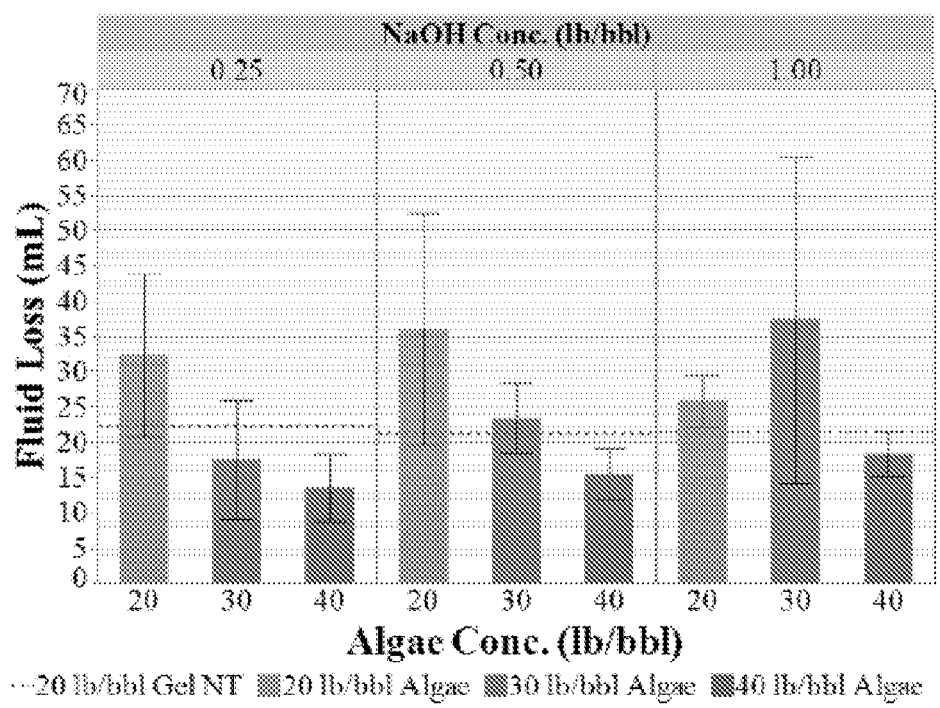
FIG. 17 is a graph of High-pressure, high temperature filtrate volume versus algae and caustic soda concentration.

High pressure, high temperature filtrate volume is a laboratory measure of how well the sample can mitigate or reduce fluid losses into the pores of the formation. FIG. 17 shows the filtrate volume reported as fluid loss as described in the API procedure. All values are an average of triplicate tests and the error bars are one (1) standard deviation from the mean. The algae powder provided the greatest fluid loss reduction at a concentration of forty (40) pounds per barrel. Although this concentration outperformed the bentonite control at all three caustic concentrations, the best performance was seen at the lowest level (0.25 pounds per barrel).

Figure 18:
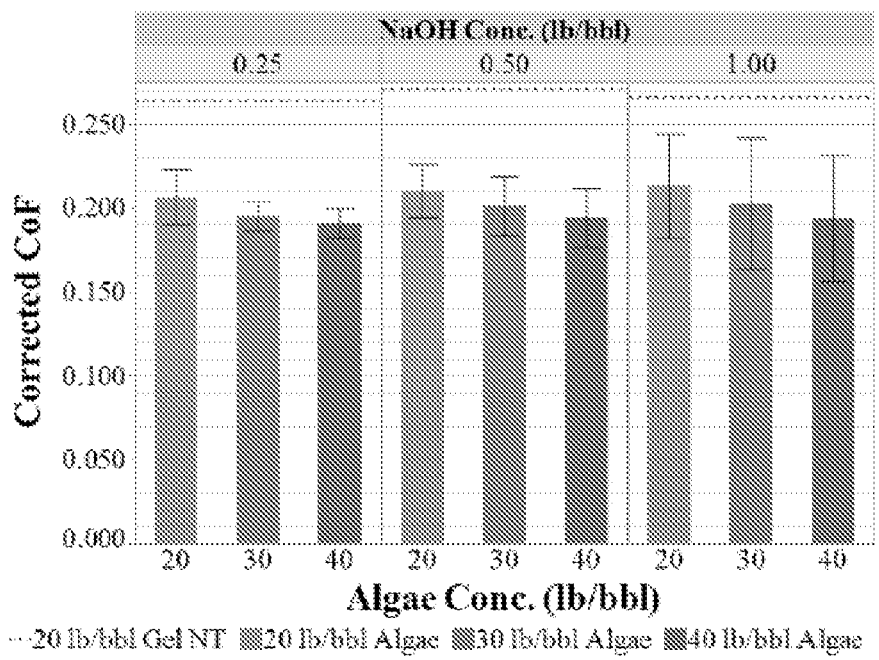
FIG. 18 is a graph of Corrected coefficient of friction versus algae and caustic soda concentration.
Figure 19:
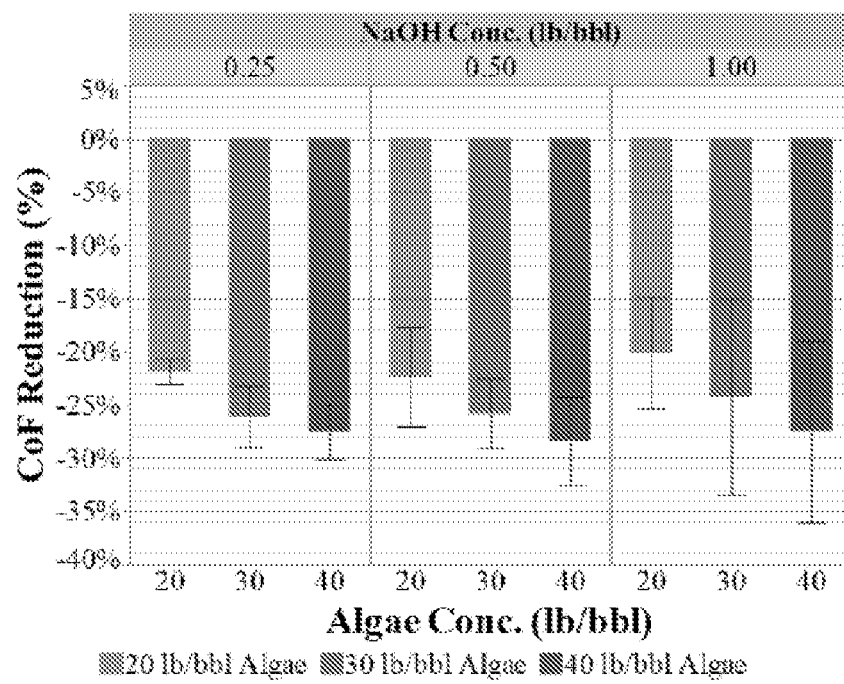
FIG. 19 is a graph of Coefficient of friction (torque) reduction versus algae and caustic soda concentration.

FIG. 18 shows the coefficient of friction for each sample corrected for the water reading as in Equation 6 using the correction factor from Equation 4. A more effective way to measure the performance of a lubricant is the reduction in coefficient of friction or torque from some control. The values for this reduction are shown in FIG. 19 calculated using Equation 7. Both figures show that an increase in caustic soda concentration correlates with an increase in coefficient of friction while an algae concentration increase leads to reduced coefficient of friction values. The worst algae sample performance still reduced the coefficient of friction by an average of twenty (20) percent compared to the bentonite control formulation; however, the reduction seen at forty (40) pounds per barrel of algae powder was the best at all three caustic concentrations with a reduction of over twenty seven (27) percent.

From these results, it appears that the denatured biomass does not have the proper rheological properties to replace bentonite in drilling fluids. However, it may help the rheological properties as an additive. While the denatured biomass did not outperform the control in regards to the rheological properties, it was found that the biomass was very effective at reducing fluid loss and increasing the lubricity. Hence, the denatured biomass holds great promise as an additive based on these latter two properties, which still being beneficial to the rheology.

Example 3

The following lubricants are mentioned in this study for comparison: Lube A is a high-performance, non-EPA-approved lubricant (HDL Plus). Lube B is an EPA approved lubricant (CoastaLube).

As shown in Table 0.4, the base drilling fluid components include a non-treated bentonite gel (Gel NT), caustic soda (NaOH), defoamer, lignite, Desco, xanthan gum, and barite. The base fluid materials were measured by weight on laboratory balances and mixed in two (2) gallon batches using a Silverson L5 M-A laboratory mixer like the one shown in FIG. 0.20. The lubricants were mixed in a lab barrel (350 ml) of base fluid in a stainless-steel mixing cup using a five spindle, single speed Multimixer as shown in FIG. 1a and FIG. 2a. Samples were aged in glass jars using a roller oven.

TABLE 0.4

Base drilling fluid component functions and concentrations.

| Component | Function | Concentration (lb/bbl) |
| --- | --- | --- |
| Water | Base fluid | Varied |
| Gel NT | Viscosifier | 20.0 |

TABLE 0.4-continued

Base drilling fluid component functions and concentrations.

| Component | Function | Concentration (lb/bbl) |
|---|---|---|
| Organic polymer | Defoamer | 0.99 |
| Caustic soda | pH modifier | 0.5 |
| Lignite | Thinner | 2.00 |
| Desco | Deflocculant | 2.00 |
| Xanthan gum | Viscosifier | 0.50 |
| Barite | Weighting agent | Varied |
| Lubricant | Lubricant | See Table 0.5 |

Twenty lab barrels—approximately two gallons—of base fluid was mixed for each batch of testing. A lab barrel is 350 milliliters and concentrations in pounds per barrel are roughly equal to grams per lab barrel as shown in Equation 0.9. The additive concentrations were held constant except for the water, barite, and lubricant. Barite and water were only adjusted to ensure a final fluid density of ten pounds per gallon while the lubricant type and concentration were varied according to Table 0.5. After measuring the proper amount of water into the mixing vessel, the Gel NT is slowly added while mixing. Then, the defoamer is added before allowing the gel to hydrate by mixing for thirty minutes. When the caustic soda is added, the fluid will thicken significantly, and the surface will no longer stir. At this point, the lignite is added to thin the fluid, followed by Desco. The xanthan gum and barite are added after ten and five minutes, respectively. After fifteen more minutes of stirring, the mud is divided into lab barrels in stainless steel malt cups. The volume of fluid that will be replaced by lubricant is extracted by syringe. The selected lubricant is then added at the given volume (the algae weight was calculated using a measured specific gravity of 1.816). The mud is then transferred to a glass jar and hot-rolled (aged) overnight in a roller oven for sixteen hours at 150° F. (65.5° C.).

Lab barrel concentration conversion. Equation 0.9

$$\frac{lbm}{bbl} = \left(\frac{lbm}{bbl}\right)\left(\frac{453.592\ g}{lbm}\right)\left(\frac{bbl}{158987.3\ ml}\right)$$
$$\cong \frac{g}{350\ ml}$$

TABLE 0.5

Additive concentration variations for each drilling fluid formulation.

| Fluid ID | Lubricant Type | Concentration (vol %) |
|---|---|---|
| 1 | None | 0.0 |
| 2 | Algae | 1.0 |
| 3 | Algae | 2.0 |
| 4 | Algae | 3.0 |
| 5 | Diesel | 1.0 |
| 6 | Diesel | 2.0 |
| 7 | Diesel | 3.0 |
| 8 | Lube A | 1.0 |
| 9 | Lube A | 2.0 |
| 10 | Lube A | 3.0 |
| 14 | Lube B | 1.0 |
| 15 | Lube B | 2.0 |
| 16 | Lube B | 3.0 |
| 17 | Algae & Lube B | 0.5 & 0.5 |
| 18 | Algae & Lube B | 1.0 & 1.0 |
| 19 | Algae & Lube B | 1.5 & 1.5 |

All rheology measurements were taken in accordance with API RP 13B-1 and manufacturer instructions using an OFITE Model 900 Viscometer.

Following hot roll, the fluid is mixed for five minutes before being added to the viscometer sample cup. The bob is submerged to the indicated line on the sleeve. The sample is heated to 120° F. and dial reading measurements are taken at 600, 300, 200, 100, 6, and 3 rpm speeds. Plastic viscosity and yield point are calculated using Equation 2 and Equation 3. Rotation is stopped for 10 seconds and the maximum initial dial reading at 3 rpm is recorded as gel strength. This is repeated for 10 and 30 minutes.

Equation 0.10: Calculation for Plastic Viscosity in Centipoise.

$$PV = R_{600} - R_{300}$$

Equation 0.11: Calculation for Yield Point in lb/100 ft².

$$YP = R_{300} - PV$$

All fluid loss measurements were taken in accordance with API RP 13B-1 and manufacturer operating instruction using an OFITE 4-Unit HTHP Filter Press. After adjusting the filter press thermocouples to 250° F., the pressurized collection cell is filled to 0.5 inches below the top. A filter paper is placed on top of the cell before installing the cap and tightening all screws and valve stems. The cell is inserted into the preheated jacket apparatus with the filter paper side down. After adjusting the top and bottom regulators to 100 psi, the top valve stem is opened to apply back-pressure to the fluid while heating. Once the cell has reached temperature, the top regulator was adjusted to 600 psi and the bottom valve opened to begin filtration at a differential pressure of 500 psi. After 30 minutes the bottom valve stem can be closed, and filtrate is collected from the condenser. To correct to the standard API filter size, the filtrate volume is doubled and recorded as the total fluid loss.

All lubricity measurements were taken in accordance with manufacturer operating instructions using an OFITE EP and Lubricity Tester. Prior to testing a set of drilling fluids, perform a calibration check on the OFITE lubricity meter by submerging the ring and block of the meter in deionized water while rotating at 60 rpm. Once the reading stabilizes, zero the torque on the meter. Using the torque arm, apply 150 inch-pounds of force for five minutes and record the stabilized torque reading. If the reading is not 34±2, repeat this process up to three times. If the issue remains after that, correct the calibration as outlined in the OFITE instruction manual. Once the reading for deionized water is within the acceptable range, record this value as the meter reading for deionized water. Calculate the correction factor (CF) using Equation 4.

Correction factor due to water reading. Equation 0.12

$$CF = \frac{34}{\text{Meter Reading for Water}}$$

After the calibration check, fill the sample container with the first drilling fluid and submerge the ring and block. Allow the readings to stabilize and zero the torque. Apply 150 inch-pounds of torque and record the reading after 5 minutes. Equation 5 shows the coefficient of friction (CoF) calculation using the torque wrench reading of 150 inch-pounds and torque shaft lever arm length of 1.5 inches. This can be corrected using Equation 6 and the correction factor from Equation 4. For an easier comparison of different studies and lubricants, a better measure is the percentage reduction of torque shown in Equation 7.

Coefficient of friction calculation for OFITE lubricity meter.   Equation 0.13

$$CoF = \frac{\text{Torque Reading}}{\left(\frac{150 \text{ in-lb}}{1.5 \text{ in}}\right)} = \frac{\tau}{100 \text{ lb}}$$

Correction of coefficient of friction with correction factor.   Equation 0.14

$$CoF_{corr} = (CoF)(CF)$$

Calculation of reduction in torque in percent.   Equation 0.15

$$\%_{red} = \frac{CoF - CoF_{base}}{CoF_{base}}(100)$$

All fluids tested in this section of experiments share the same base fluid with only lubricant type and concentration varying from sample to sample; however, there are slight fluctuations in the properties of the base fluid with each batch mixed. To reduce any skew of the data due to this, a control with no lubricant was run with each batch of testing to give a clear baseline. For an easier comparison among batches and tests, the results for each test are calculated as a percent change from the appropriate control sample. This also allows for a more straightforward method of comparing the results with literature data with which base fluid composition may differ.

Figure 20A:
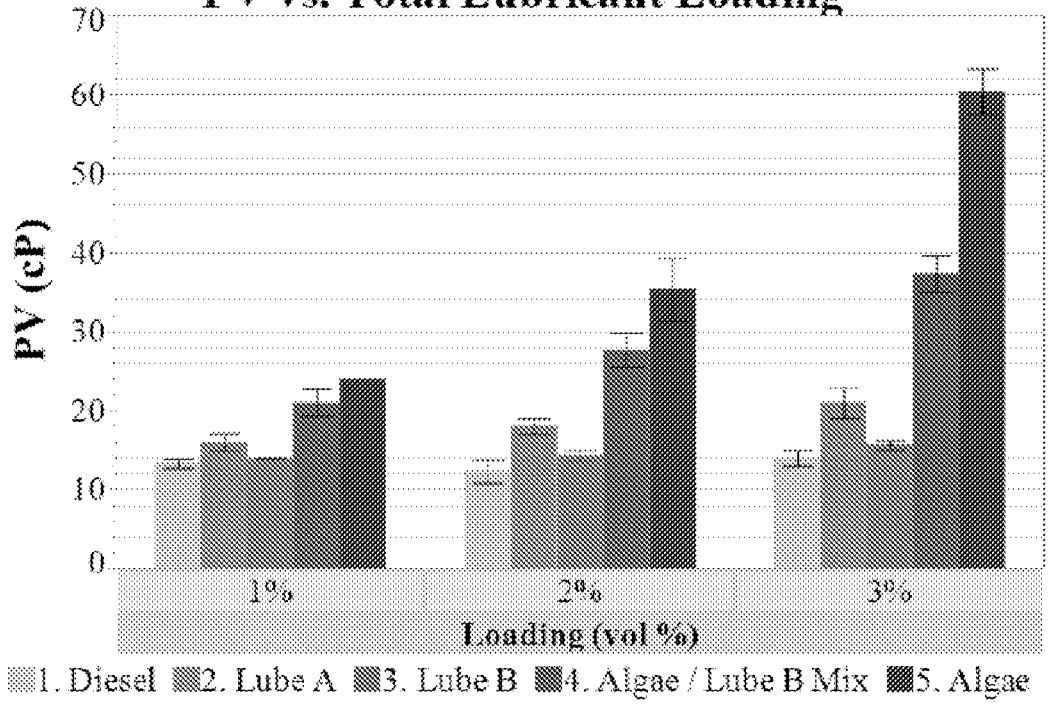
FIG. 20a is a graph of Plastic Viscosity (PV) change results versus lubricant type.
Figure 20B:
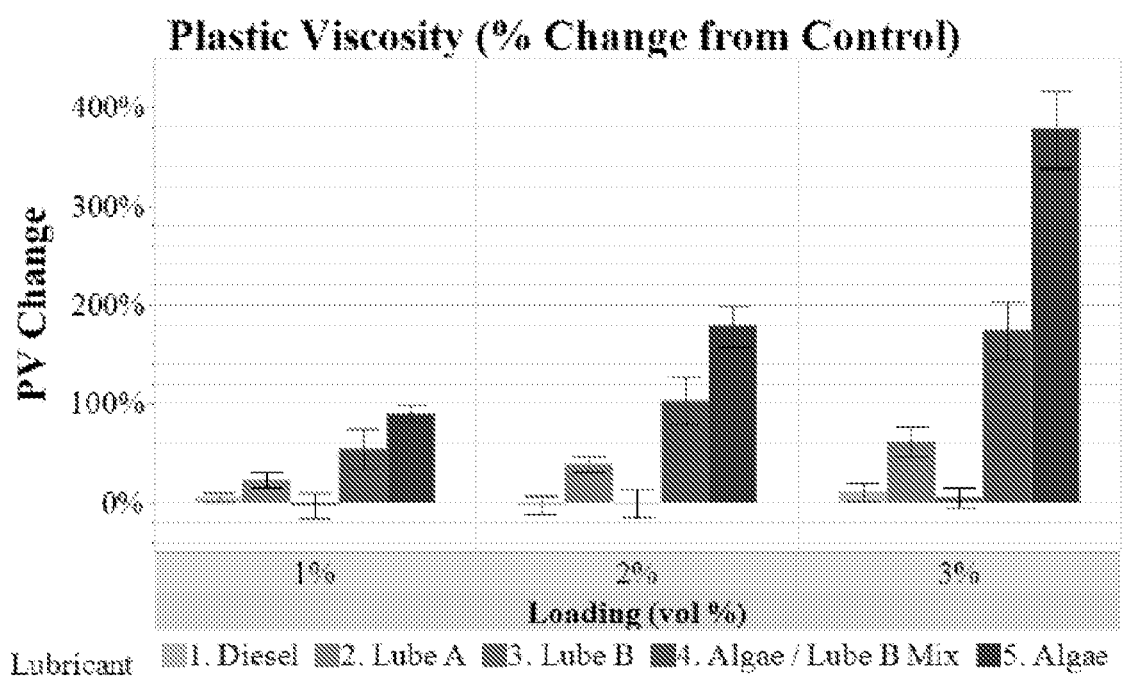
FIG. 20b is a graph of Plastic Viscosity (PV) change results versus lubricant concentration.
Figure 21A:
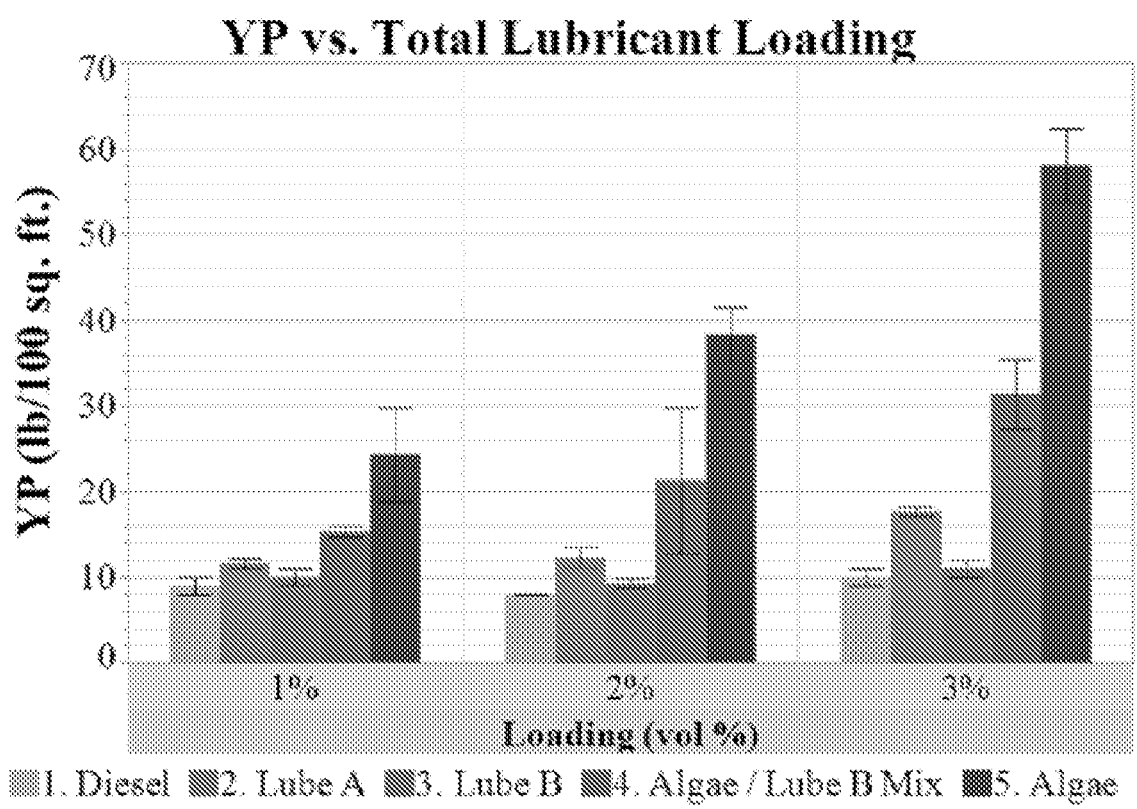
FIG. 21a is a graph of Yield Point (YP) change results versus lubricant type
Figure 21B:
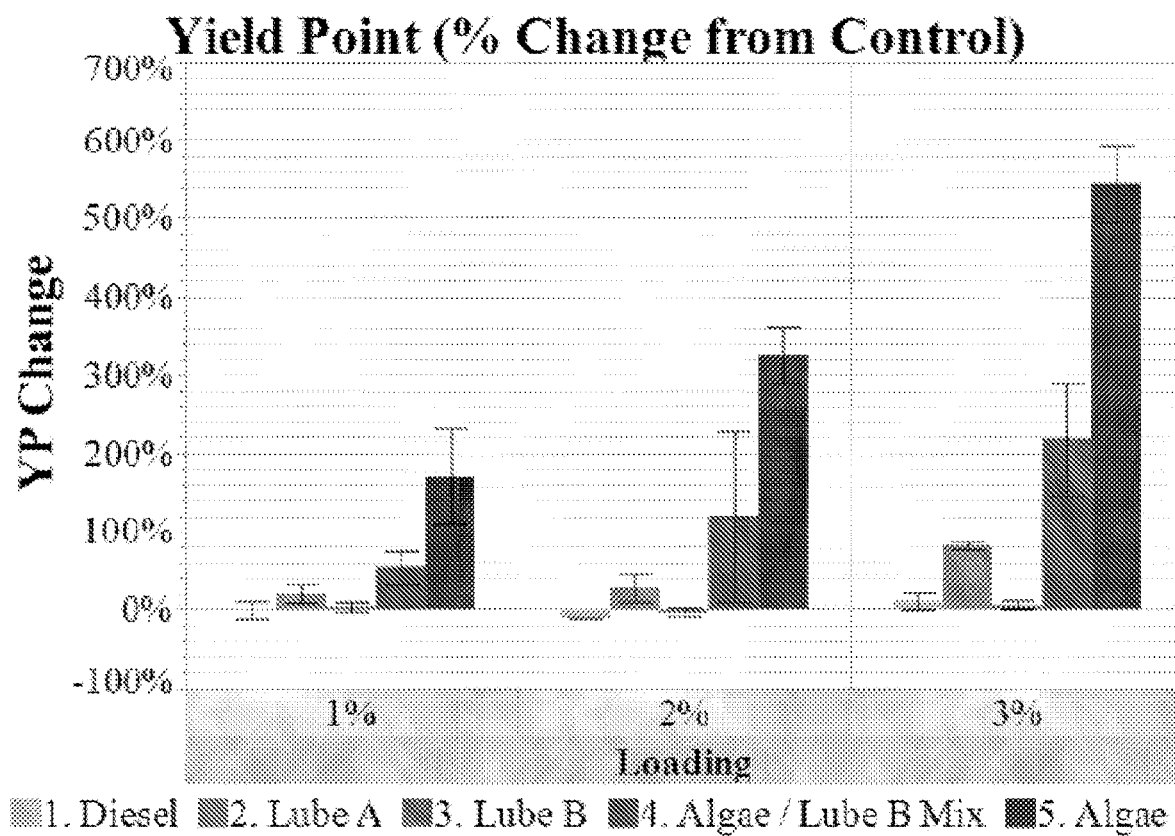
FIG. 21b is a graph of Yield Point (YP) change results versus concentration.

Bingham plastic is a common two-parameter model for non-Newtonian fluids and is the traditional method of fluid characterization in the field since the parameters can be quickly calculated without the use of a computer or complex algorithm. The plastic viscosity (PV) and yield point (YP) for each sample calculated using Equation 2 and Equation 3 are shown in FIG. 20 and FIG. 21. All values are an average of triplicate tests and the error bars are one (1) standard deviation from the mean. As seen in FIG. 20 and FIG. 21, the algae and algae/lube B samples had the largest effect on plastic viscosity and yield point with lube A also showing a lesser increase. At three (3) percent algae concentration the PV and YP increased from the control by nearly 380 percent and 540 percent, respectively. At the same total lubricant concentration, the half-and-half mixture of algae and Lube B only caused a 175 percent PV increase and a 220 percent YP increase.

Figure 22:
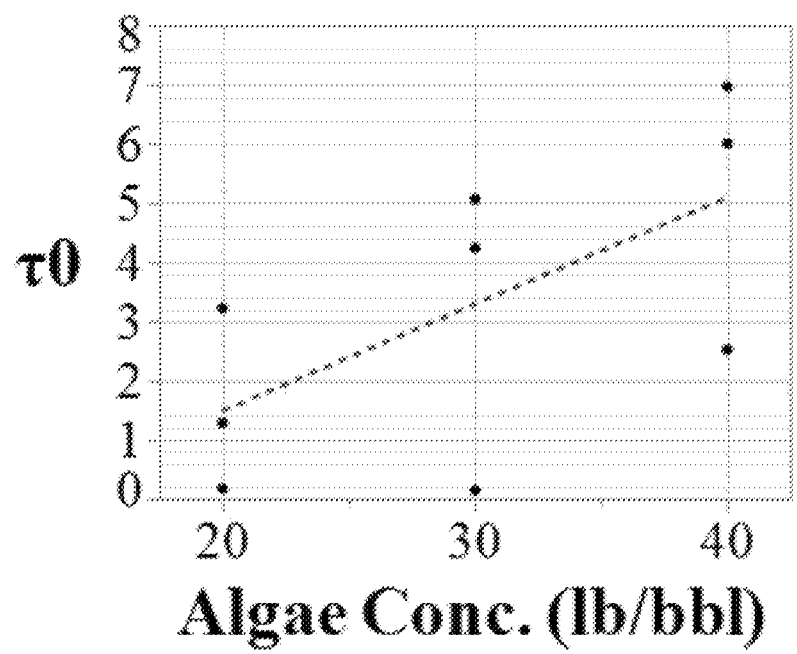
FIG. 22 is a Fit of H-B parameter TO versus algae concentration.
Figure 23:
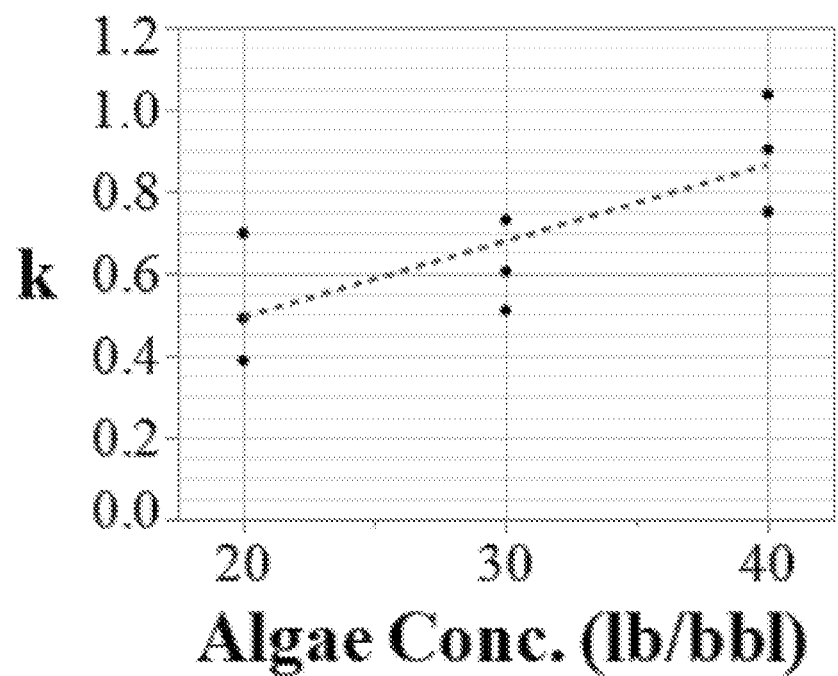
FIG. 23 is a Fit of H-B parameter k versus algae concentration.
Figure 24:
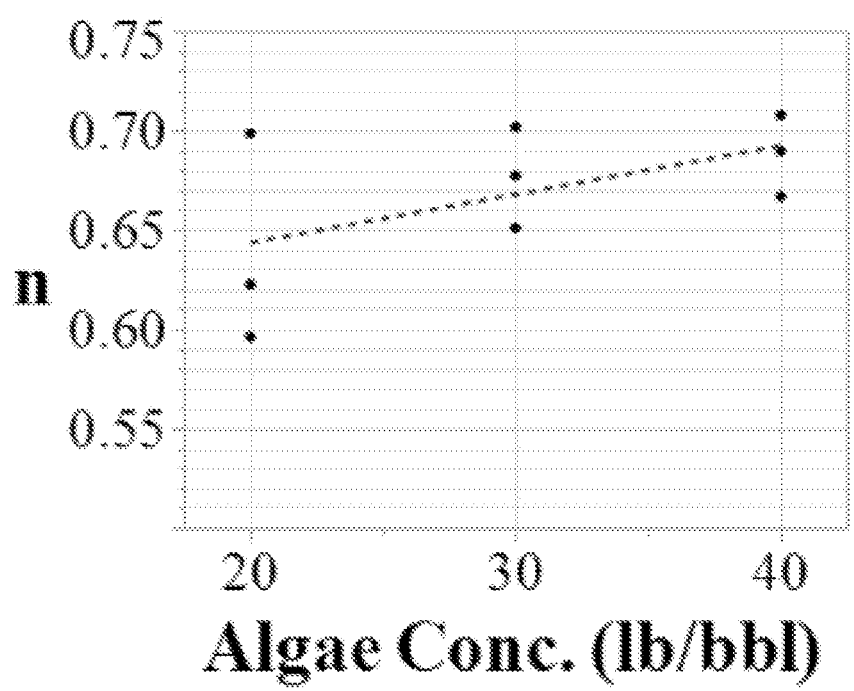
FIG. 24 is a Fit of H-B parameter n versus algae concentration.

Though Bingham-plastic is commonly used for characterizing drilling fluid rheological properties, research has shown that Herschel-Bulkley, a three-parameter model for viscosity shown in Equation 8 is a better fit for the behavior of water-based bentonite drilling fluids. The rheology readings for all fluids with were fit to a curve using the Herschel-Bulkley model. The fitted model parameters versus algae and caustic concentration are shown in FIG. 22, FIG. 23, and FIG. 24.

Equation 0.16: Shear stress as a function of shear rate using the Herschel-Bulkley model.

$$\tau = \tau_0 + k\dot{\gamma}^n$$

Figure 25A:
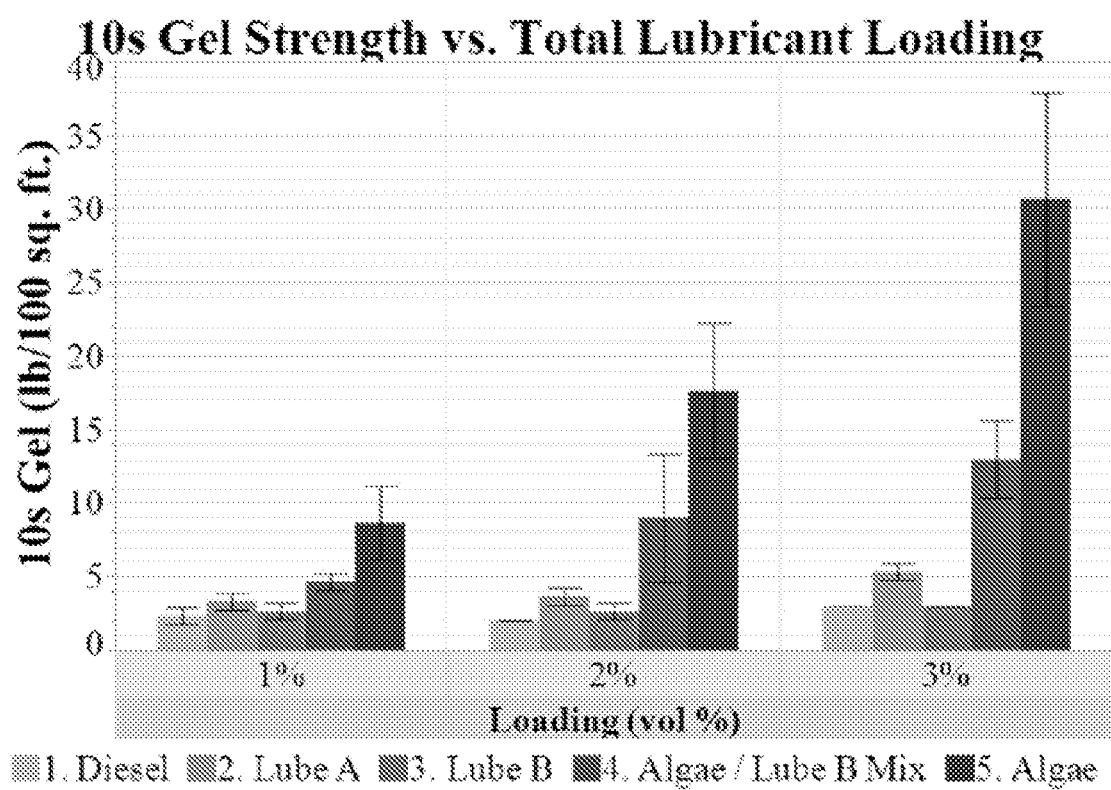
FIG. 25a is Ten second gel strength change results versus lubricant type.
Figure 25B:
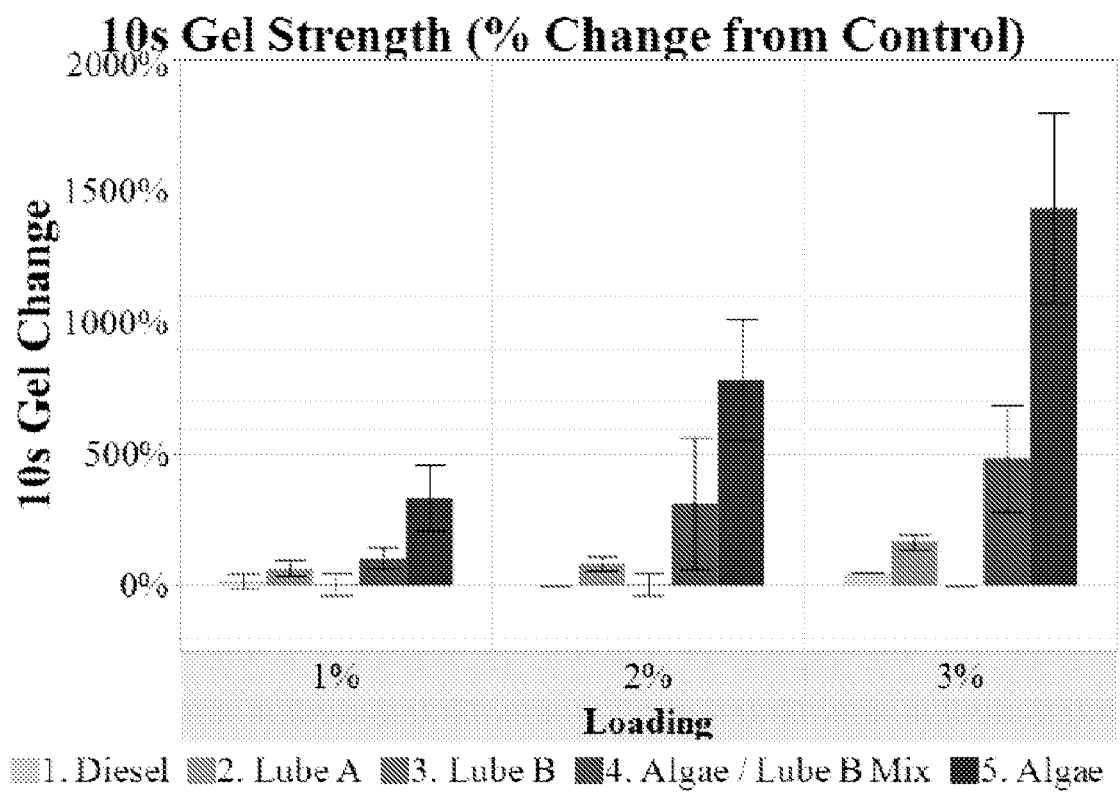
FIG. 25b is Ten second gel strength change results versus concentration.
Figure 26A:
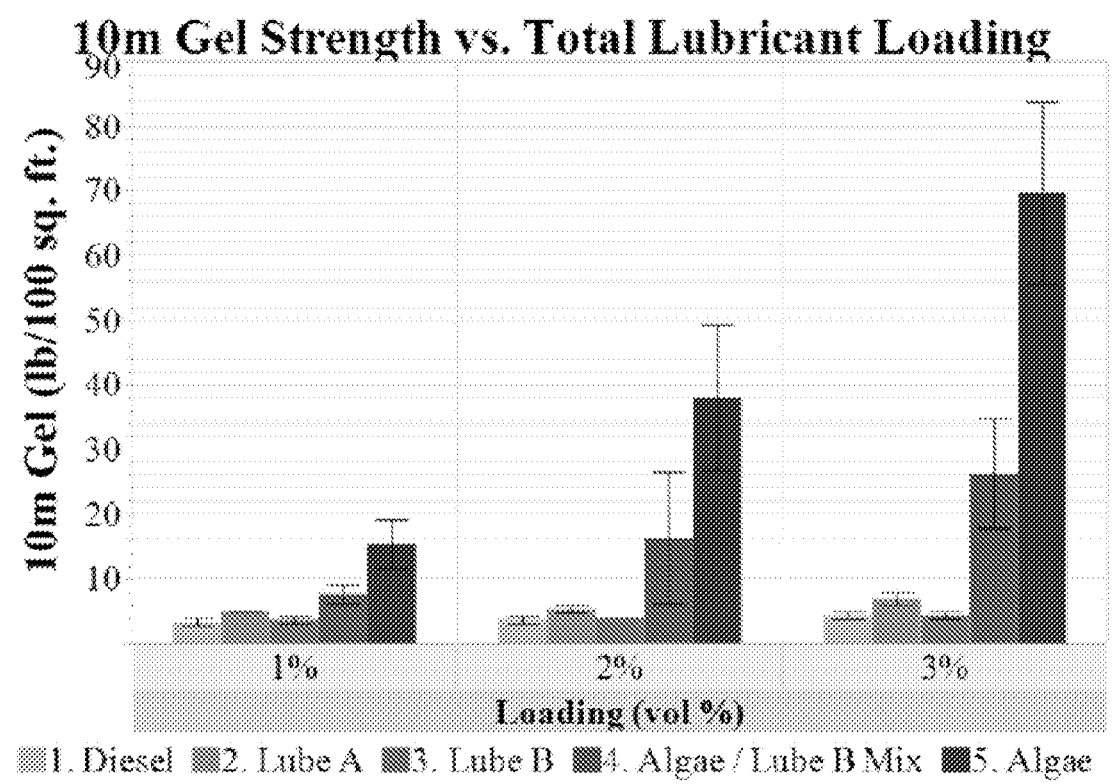
FIG. 26a is Ten-minute gel strength change results versus lubricant type.
Figure 26B:
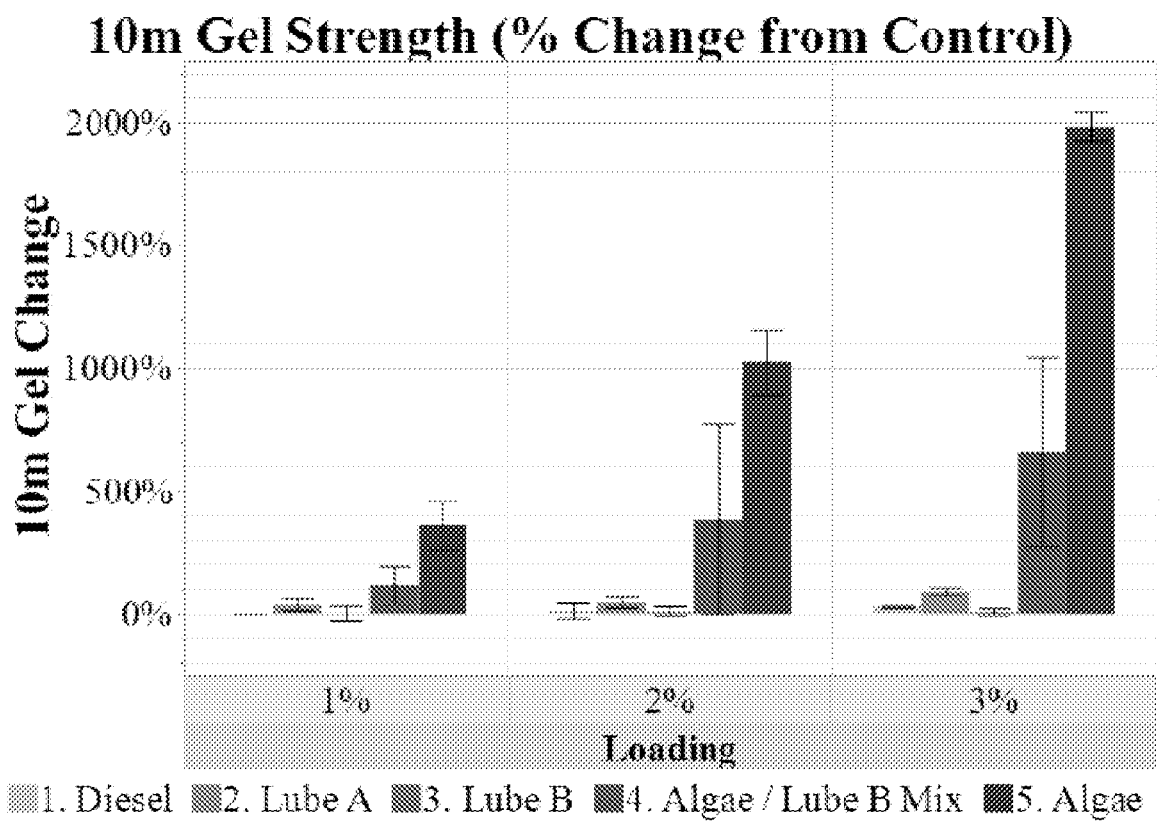
FIG. 26b is Ten-minute gel strength change results versus concentration.
Figure 27A:
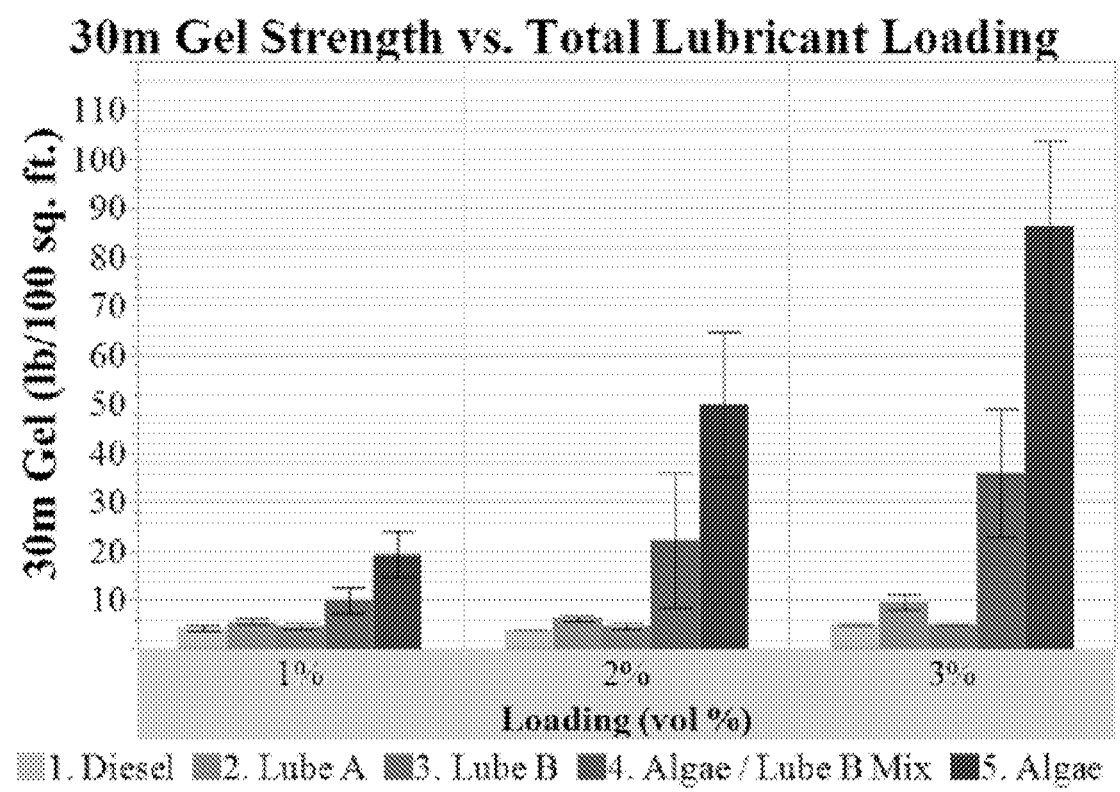
FIG. 27a is Thirty-minute gel strength change results versus lubricant.
Figure 27B:
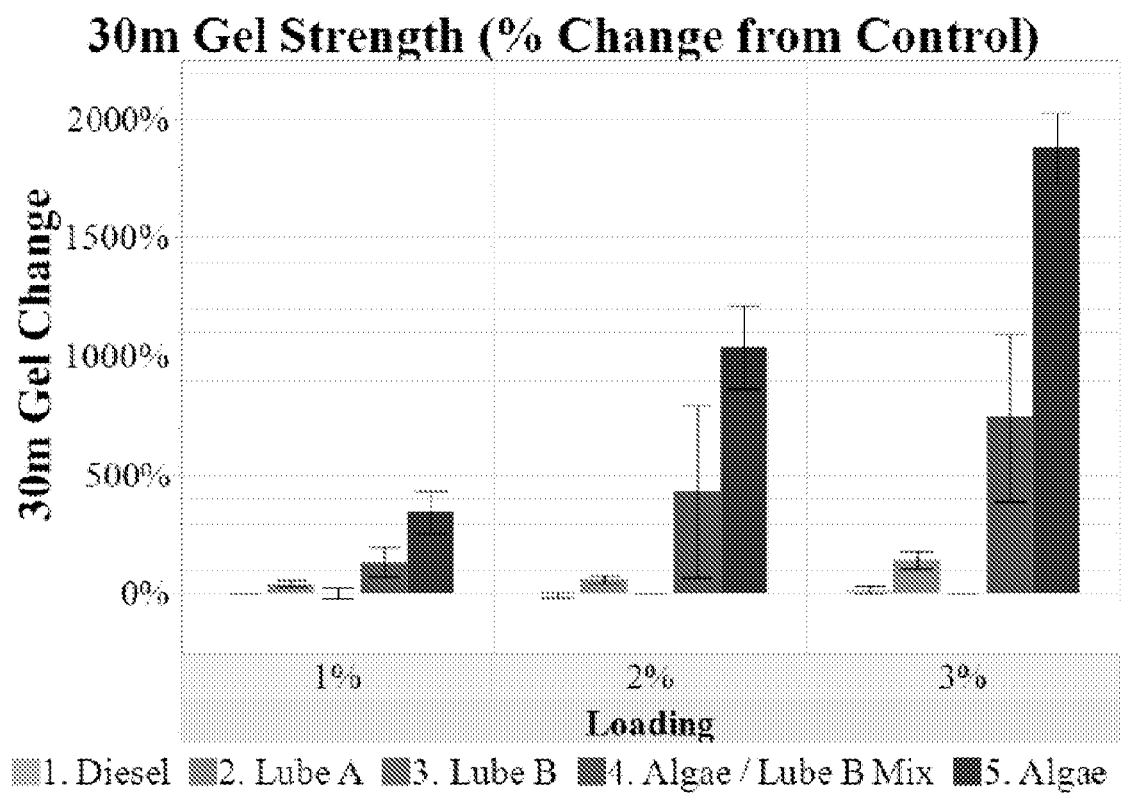
FIG. 27b is Thirty-minute gel strength change results versus concentration.

The gel strength is a measure of the ability of a fluid to maintain viscosity after a period of static rest. FIG. 25$a,b$, FIG. 26$a,b$, and FIG. 27$a,b$ show the change in ten-second, ten-minute, and thirty-minute gel strength readings, respectively. All values are an average of triplicate tests and the error bars are one (1) standard deviation from the mean. Like the plastic viscosity and yield point, the gel strength reading is largely unaffected by diesel or Lube B alone; however, there is a slight impact from Lube A and a sizable increase from the algae and algae/Lube B samples. Because the control gel strength values were very low, the percentage increases may appear large. The algae ranged from an increase of about 300 percent at the lowest concentration to nearly 2000 percent at the highest, while the mixture with Lube B was around 100 percent and 750 percent at the same concentrations.

Figure 28A:
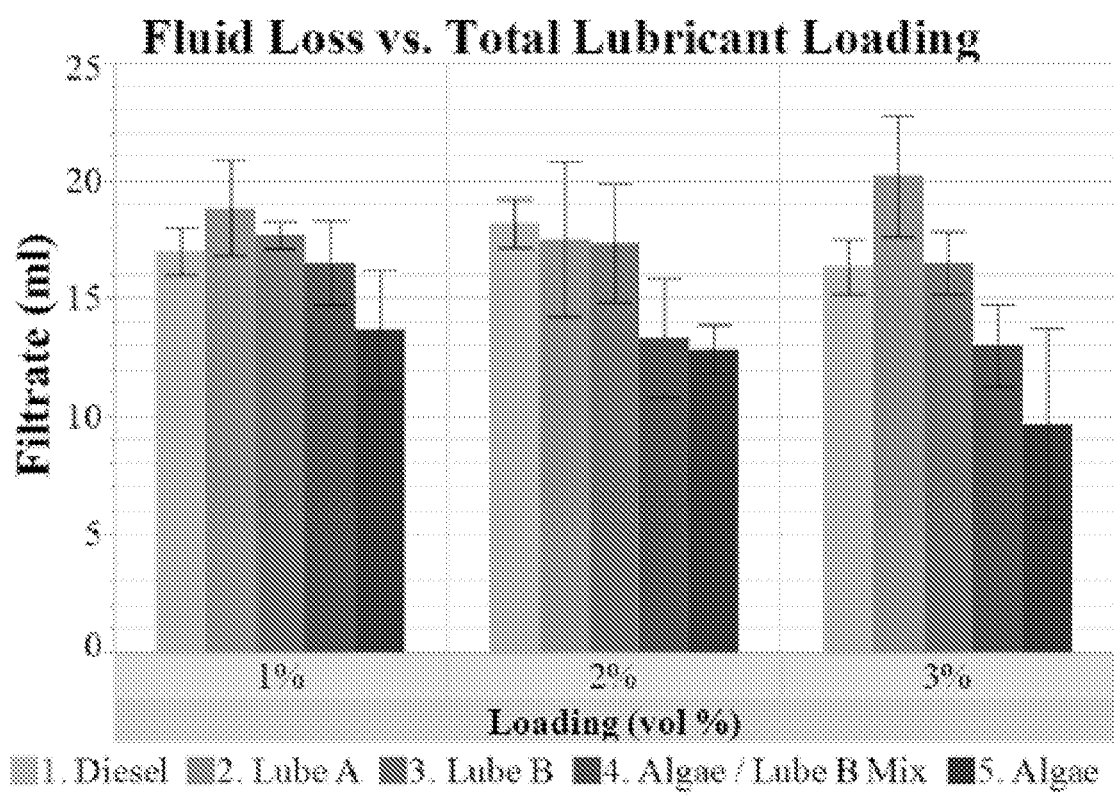
FIG. 28a is High-pressure, high temperature filtrate volume change versus lubricant type.
Figure 28B:
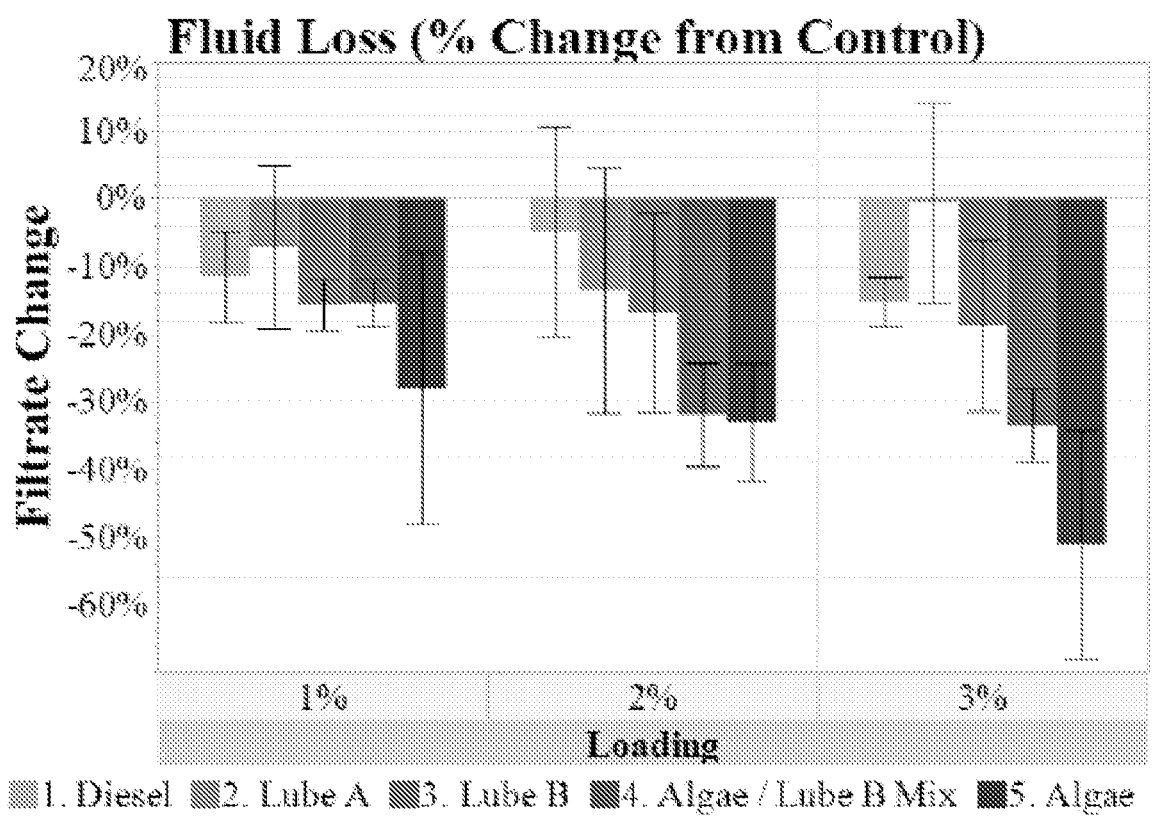
FIG. 28b is High-pressure, high temperature filtrate volume change versus concentration.
Figure 29A:
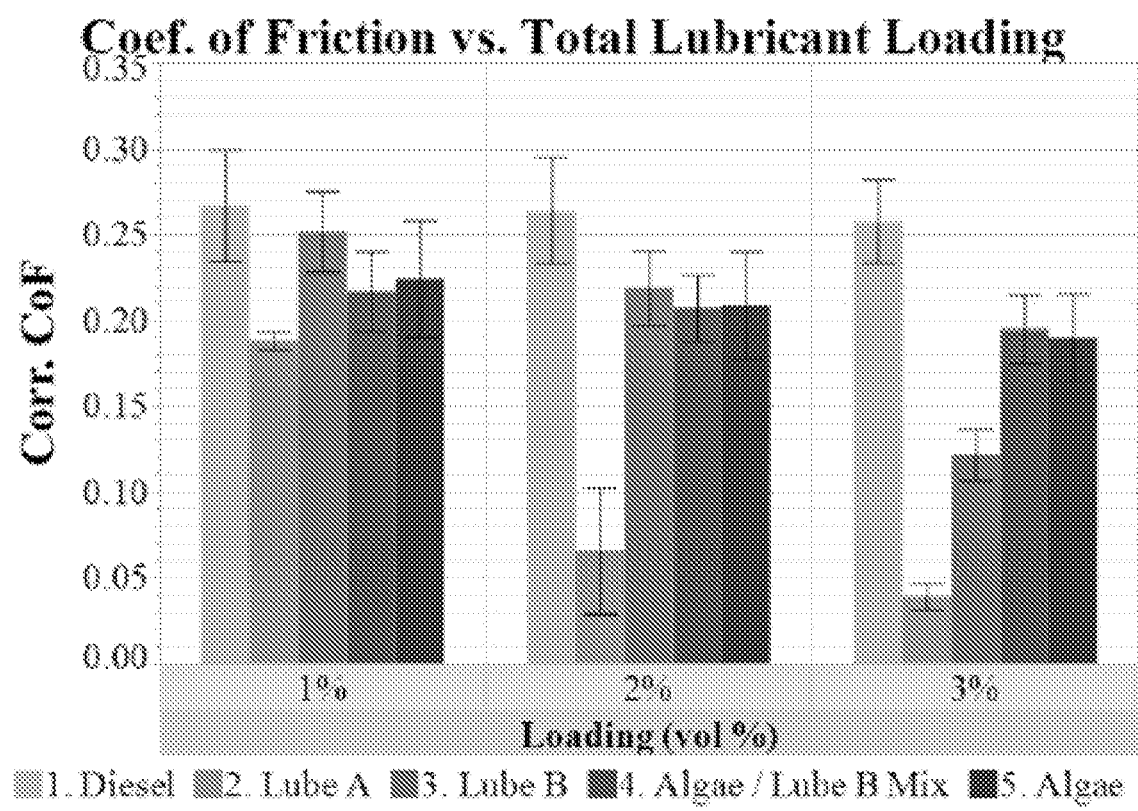
FIG. 29a is Coefficient of friction (torque) change versus lubricant.
Figure 29B:
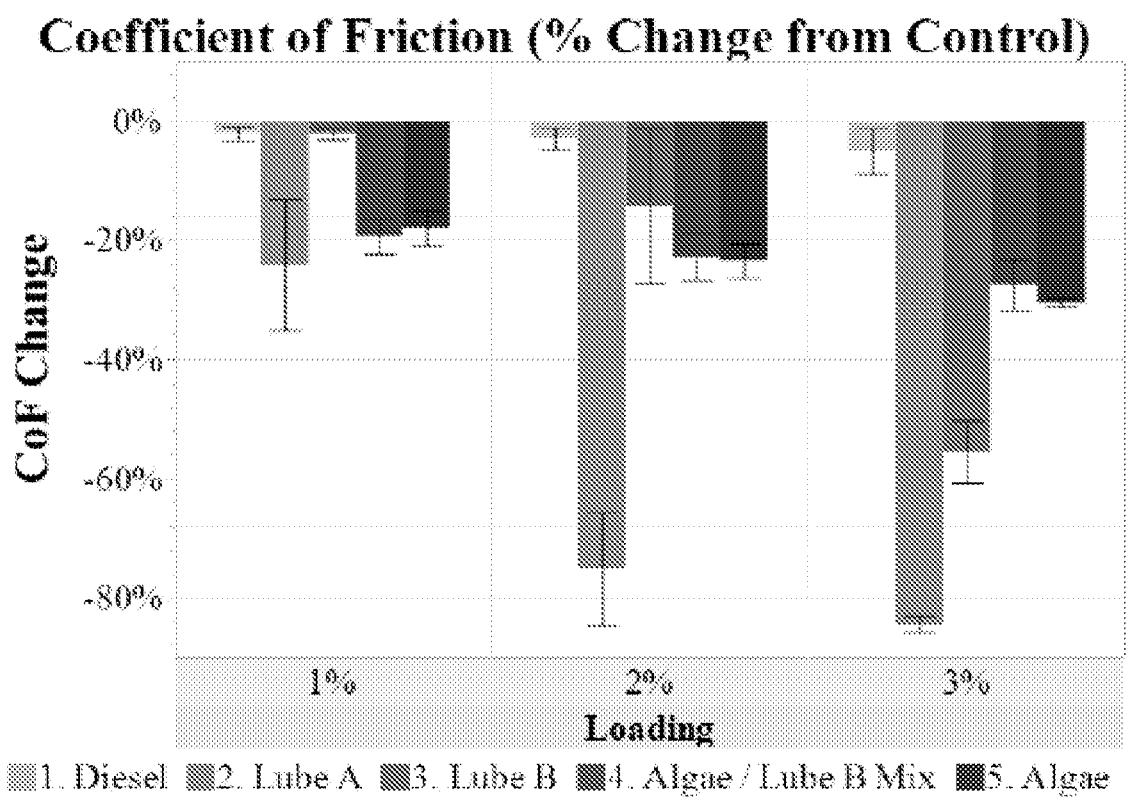
FIG. 29b is Coefficient of friction (torque) change versus concentration.
Figure 30:
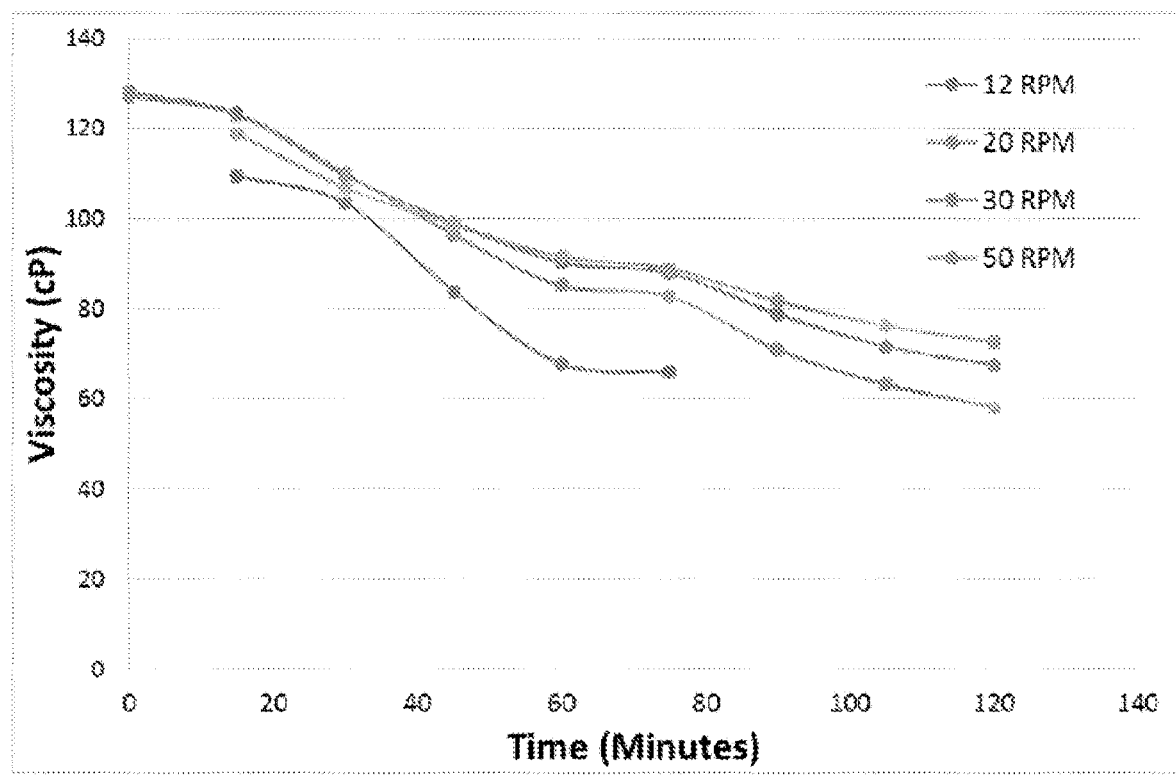
FIG. 30 is a table showing the viscosity over time for a variety of shear rates. It can be seen that at as the RPM of the experiment is increased, the viscosity increases in response to the higher shear rate.

High pressure, high temperature filtrate volume is a laboratory measure of how well the sample can mitigate or reduce fluid losses into the pores of the formation. FIG. 28 shows the filtrate volume reported as fluid loss as described in the API procedure. All values are an average of triplicate tests and the error bars are one (1) standard deviation from the mean. The algae powder provided the greatest fluid loss reduction across all concentrations. Worth noting is that at two (2) percent total lubricant loading, the algae/lube B mixture exhibited nearly identical behavior to that of the algae alone even though it only contains half as much algae.

One of the most effective ways to measure the performance of a lubricant is the reduction in coefficient of friction or torque from a control. The values for this reduction are shown in FIG. 32 calculated using Equation 7. All values are an average of triplicate tests and the error bars are one (1) standard deviation from the mean. These results show that the commercial lubricant (Lube A) performed the best at all three concentrations. It is important to note, however, that the algae/Lube B mixture out performed Lube B at one (1) and two (2) percent concentrations and had very similar results to the algae powder alone despite having half as much of the substance.

As a drilling fluid additive and lubricant, the denatured biomass continued to show promising results. It improved the plastic viscosity, yield stress, fluid loss, and gel strength of the mixture more so than the other lubricants studied. 50:50 mixtures of Lube B with denatured biomass also showed promising results. In regard to lubricity as assessed by coefficient of friction reduction, the denatured biomass did not perform as well as Lube A which is environmentally hazardous. However, the denatured biomass outperformed Lube B, especially at lower loadings, which indicates that it is highly competitive in the "environmentally friendly" and EPA-approved class of drilling fluid additives. It should also be noted that combinations of these additives may be of strategic value. For instance, the 50:50 mixture of Lube B and our biomass additive had a significantly lower plastic viscosity but had a similarly lubricating effect as evidenced by the CoF reduction, so this may be a good solution where a lower viscosity is desired but more lubrication is needed.

For the purpose of understanding the SUSTAINABLE AGENTS FOR ENHANCED OIL RECOVERY AND DRILLING ADDITIVES DERIVED FROM MICROBIAL BIOMASS, references are made in the text to exemplary embodiments of an SUSTAINABLE AGENTS FOR ENHANCED OIL RECOVERY AND DRILLING ADDI- TIVES DERIVED FROM MICROBIAL BIOMASS, only some of which are described herein. No limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

The invention claimed is:

1. A composition of matter for enhanced oil recovery comprising:
    a denatured *Spirulina plantesis* protein, wherein the denatured *Spirulina plantesis* protein is denatured with a denaturant selected from a group consisting of: sodium hydroxide and urea;
    and wherein the composition has an at least 50 dry wt % of the denatured *Spirulina plantesis* protein.

2. The composition of claim 1, wherein the denaturant is sodium hydroxide.

3. The composition of claim 1, wherein the denaturant is urea.

4. The composition of claim 1, wherein the composition has a fluid density of ten pounds per gallon.

5. The composition of claim 1, wherein the denaturant is sodium hydroxide, and wherein the composition has a mean contact angle of 40.51°.

* * * * *